United States Patent
Lu

(10) Patent No.: US 12,452,766 B2
(45) Date of Patent: Oct. 21, 2025

(54) RELAY METHOD, METHOD FOR GENERATING ROUTING TABLE, AND DEVICE

(71) Applicant: GUANGDONG OPPO MOBILE TELECOMMUNICATIONS CORP., LTD., Guangdong (CN)

(72) Inventor: Qianxi Lu, Guangdong (CN)

(*) Notice: Subject to any disclaimer, the term of this patent is extended or adjusted under 35 U.S.C. 154(b) by 487 days.

(21) Appl. No.: 17/894,678

(22) Filed: Aug. 24, 2022

(65) Prior Publication Data

US 2022/0408342 A1    Dec. 22, 2022

Related U.S. Application Data

(63) Continuation of application No. PCT/CN2020/076487, filed on Feb. 24, 2020.

(51) Int. Cl.
    *H04W 40/24* (2009.01)
    *H04B 7/15* (2006.01)

(52) U.S. Cl.
    CPC ............ *H04W 40/246* (2013.01); *H04B 7/15* (2013.01)

(58) Field of Classification Search
    CPC ................................ H04W 40/246; H04B 7/15
    See application file for complete search history.

(56) References Cited

U.S. PATENT DOCUMENTS

| | | | |
|---|---|---|---|
| 2016/0080531 A1* | 3/2016 | Agiwal | H04W 4/70 370/474 |
| 2018/0287689 A1 | 10/2018 | Lee et al. | |
| 2019/0349834 A1 | 11/2019 | Teyeb et al. | |
| 2021/0144570 A1* | 5/2021 | Chae | H04W 72/02 |
| 2021/0368417 A1* | 11/2021 | Luo | H04W 40/22 |
| 2023/0073469 A1* | 3/2023 | Wang | H04W 40/22 |

FOREIGN PATENT DOCUMENTS

| | | |
|---|---|---|
| CN | 101668324 A | 3/2010 |
| CN | 102098725 A | 6/2011 |
| CN | 108029148 A | 5/2018 |
| CN | 108809897 A | 11/2018 |
| WO | 2018176416 A1 | 10/2018 |

OTHER PUBLICATIONS

3GPP TSG-RAN2 Meeting #98 Hangzhou, China, R2-1704097, OPPO, TP on Layer-2 Relay Data Identification, May 15-19, 2017. (6 pages).

(Continued)

*Primary Examiner* — Derrick V Rose
(74) *Attorney, Agent, or Firm* — Young Basile Hanlon & MacFarlane, P.C.

(57) ABSTRACT

A relay terminal includes a relay protocol stack, the relay protocol stack being located between a packet data convergence protocol (PDCP) layer and a layer 2 protocol stack, or the relay protocol stack being a media access control (MAC) layer protocol stack. The relay method includes: a relay receiving entity receiving a relay protocol data unit (PDU) sent by a previous hop node, and transmitting the relay PDU to a relay sending entity; and the relay sending entity sending the relay PDU to a next hop node.

20 Claims, 13 Drawing Sheets

(56) References Cited

OTHER PUBLICATIONS

3GPP TSG RAN WG2 Meeting #98 Hangzhou, China, R2-1704553, Coolpad, Discussion on Signaling Radio Bearer Modelling for L2 Relay UE, May 15-19, 2017. (4 pages).
Extended European Search Report for EP Application 20922133.2 mailed Mar. 21, 2023. (11 pages).
International search report and Written Opinion with English Translation of PCT/CN2020/076487 mailed Oct. 29, 2020 (15 pages).
ZTE Consideration on Routing in I AB Architecture Ia and Ib 3 GPP TSG-RAN WG2 #103 R2-1812469, Aug. 10, 2018 (4 pages).
ZTE Discussion on layer 2 ProSe UE-to-network relay for feD2D 3GPP TSG-RAN WG2 Meeting #95bis R2-166815, Sep. 30, 2016 (6 pages).
Chinese First Office Action and English translation for Chinese Patent Application No. 202310184554.0, mailed Jun. 19, 2024, 30 pages.

* cited by examiner

| R | R | R | Radio bearer identifier | OCT1 |
|---|---|---|---|---|
| Source identifier ||||  OCT2 |
| Source identifier |||| OCT3 |
| PDCP PDU |||| OCT4···OCTn |

FIG. 3

| R | R | R | Radio bearer identifier | OCT1 |
|---|---|---|---|---|
| Source identifier |||| OCT2 |
| Source identifier |||| OCT3 |
| Destination identifier |||| OCT4 |
| Destination identifier |||| OCT5 |
| PDCP PDU |||| OCT5···OCTn |

FIG. 4

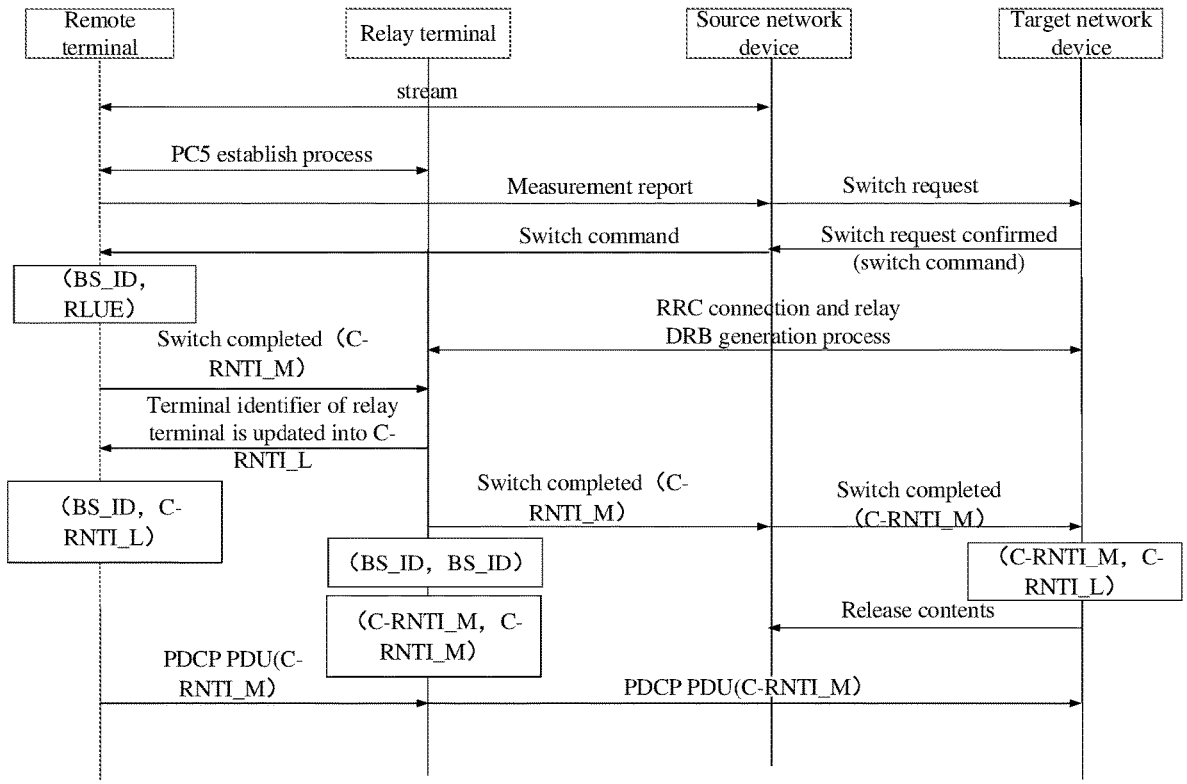

FIG. 15 the first relay PDU sent from the remote terminal is received. The protocol
header of the first relay PDU includes the terminal identifier of the remote
terminal, and the first relay PDU is the relay PDU sent by the remote terminal to
the network device                                                                          ⟶ 1610 the third routing relationship is established, the third routing relationship
includes the terminal identifier and the node identifier of the previous node of the
network device, and the third routing relationship is the routing relationship
when the terminal identifier is taken as the destination identifier                         ⟶ 1620

FIG. 16

RELAY METHOD, METHOD FOR GENERATING ROUTING TABLE, AND DEVICE

CROSS-REFERENCE TO RELATED APPLICATION(S)

The present application is a continuation-application of International (PCT) Patent Application No. PCT/CN2020/076487, filed on Feb. 24, 2020, and the entire contents of which are hereby incorporated by reference in their entireties.

TECHNICAL FIELD

The present disclosure relates to the field of communication, and in particular to a relay method, a method for generating a routing table, an apparatus, a device and a storage medium.

BACKGROUND

In the fifth generation wireless systems (5G), in order to expand a coverage area and a coverage effect of a network, a relay terminal may be configured between a remote terminal and a network device. The relay terminal may be configured to transmit a data packet or signaling between the remote terminal and the network device.

In the art, the remote terminal and the relay terminal may be connected via a PC5 interface. The relay terminal and the network device may be connected via a Uu interface. While implementing, the network device may configure a mapping relationship between a local index and a radio bearer identifier and send the configured mapping relationship to the relay terminal. The local index is configured to identify the remote terminal, and the radio bearer identifier is configured to identify a radio bearer. In this way, the remote terminal sends a protocol data unit (PDU) to the relay terminal, and the PDU carries a local index of the remote terminal. The relay terminal receives the relay PDU, determines a corresponding radio bearer based on the local index and the above-mentioned mapping relationship, and sends the relay PDU to the network device via the radio bearer.

However, communication between the remote terminal and the network device can be achieved only when the mapping relationship between the remote terminal and the radio bearer is completely configured by a base station. Therefore, a relay solution is less flexible.

SUMMARY

The present disclosure provides a relay method, a method for generating a routing table, an apparatus, a device and a storage medium, such that the communication between the remote terminal and the network device can be achieved flexibly. The present disclosure includes following technical solutions.

According to a first aspect, a relay method is provided and is applied to a relay terminal. The relay terminal includes a relay protocol stack, the relay protocol stack is configured to be between a packet data convergence protocol (PDCP) layer and a layer 2 protocol stack or to be a protocol stack of a medium access control (MAC) layer, and the relay protocol stack includes a relay receiver entity and a relay sender entity, including: receiving, by the relay receiver entity, a relay protocol data unit (PDU) sent by a prior node, and transmitting, by the relay receiver entity, the relay PDU to the relay sender entity; and sending, by the relay sender entity, the relay PDU to a next node.

According to a second aspect, a method of generating a routing table is provided and is performed by a relay terminal. The method includes: receiving a first relay protocol data unit (PDU) from a remote terminal, the first relay PDU including a terminal identifier of the remote terminal and the first relay PDU being sent from the remote terminal to a network device; and establishing a first routing relationship based on the terminal identifier of the remote terminal and a node identifier of a prior node, the first routing relationship being a routing relationship defining that the terminal identifier is taken as a destination identifier.

According to a third aspect, a relay terminal is provided and includes a processor and a memory. The memory stores at least one instruction, the at least one instruction is configured to be executed by the processor to implement any method performed by the relay terminal of the first aspect and the second aspect.

BRIEF DESCRIPTION OF DRAWINGS

In order to more clearly illustrate technical solutions of embodiments of the present disclosure, the accompanying drawings for the embodiments will be briefly described in the following. Obviously, the drawings in the following show only some of the embodiments of the present disclosure. Any ordinary skilled person in the art may obtain other drawings based on these drawings without any creative work.

FIG. 3 is a schematic view of a relay PDU format according to an embodiment of the present disclosure.

FIG. 4 is a schematic view of another relay PDU format according to an embodiment of the present disclosure.

FIG. 15 is a schematic view of a relay process according to still another embodiment of the present disclosure.

FIG. 16 is a flow chart of a method of generating a routing table according to another embodiment of the present disclosure.

DETAILED DESCRIPTION

Figure 1:
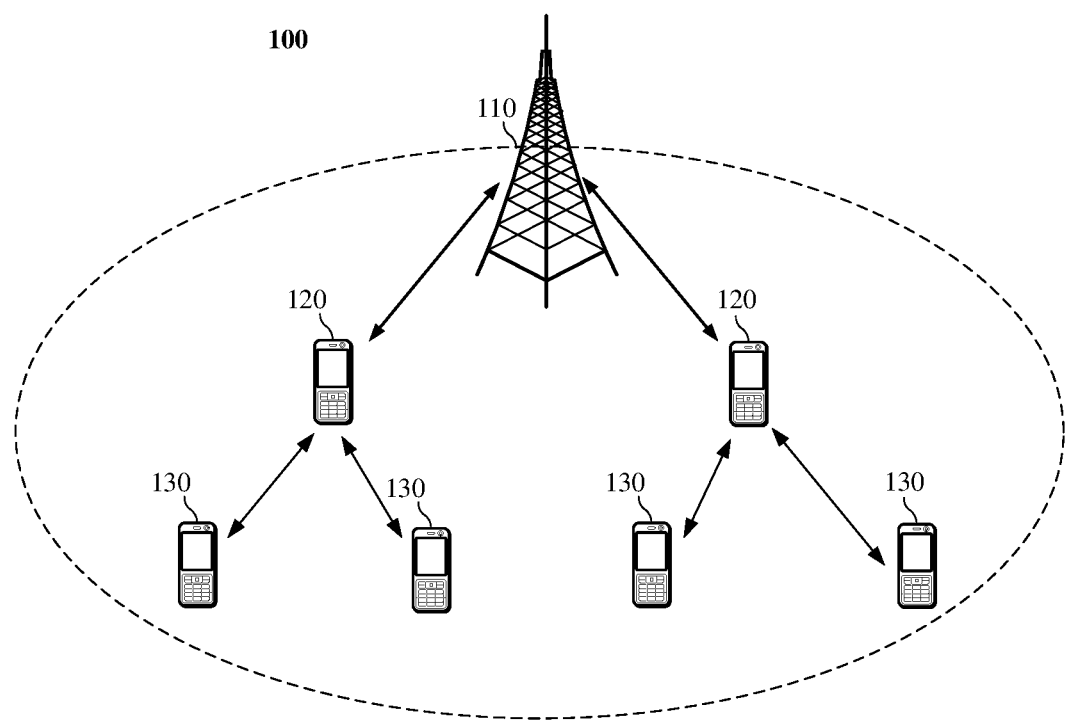
FIG. 1 is a schematic view of a communication system according to an embodiment of the present disclosure.

In order to make the purpose, technical solutions and advantages of the present disclosure clearer, embodiments of the present disclosure will be further described in detail by referring to accompanying drawings.

Before providing a detailed description of a relay method and a method of generating a routing table provided by embodiments of the present disclosure, terminologies and an implementation environment involved in the embodiments will be described in brief.

First, the terminologies involved in the embodiments will be described in brief.

Radio Bearer: The radio bearer is an aggregate of wireless logical resources and includes a signal radio bearer (SRB) and a data radio bearer (DRB). The DRB includes a default bearer and a dedicated bearer.

A communication link between communication devices, such as between a terminal and a network device, between two terminals, between two network devices, may take one or more radio bearers for assistance. For example, a network device may take a radio bearer to generate one or more signals and/or to send one or more signals to a terminal.

Uu interface: An air interface between the network device and the terminal (or a user equipment, UE) is referred to as the Uu interface.

PC5 interface: The is an interface introduced between two communication devices. In the embodiments of the present disclosure, the remote terminal and the relay terminal may establish communication through the PC5 interface. Alternatively, two relay terminals may establish communication through the PC5 interface.

Sidelink: The sidelink is an important branch of the cellular IoT technology, i.e. the IoT communication technology. The sidelink allows direct communication between two terminals, such as between the remote terminal and the relay terminal in the present disclosure, or between two relay terminals. The sidelink communication may perform addressing by a source identifier (source ID) and a destination identifier (destination ID) of the media access control (MAC) layer. Before transmission, a connection between UEs does not need to be established in advance, and the Sidelink communication may allow a faster and more efficient connection between the UEs.

Various Protocol Entities in a Protocol Stack of a Wireless Access Network:

1) Service data adaptation protocol (SDAP): The SDAP is responsible for mapping a QoS bearer to the radio bearer based on Quality-of-Service (QoS) requirements. The SDAP layer is absent from a long term evolution (LTE) system. However, the SDAP entity is required for a new QoS processing in new radio (NR) when the 5G core network is connected.

2) Packet Data Convergence Protocol (PDCP): The PDCP enables IP header compression, encryption and integrity protection. While switching, the PDCP also performs retransmission, in-order delivery and deleting deduplicated data. For bearer-separation dual connection, the PDCP may provide routing and replication. That is, one PDCP entity is configured for each radio bearer of the terminal.

3) Radio-Link Control (RLC): The RLC is configured for data segmentation and retransmission. The RLC provides services to the PDCP in a form of RLC signaling. Each RLC channel (corresponding to each radio bearer) configures one RLC entity for one terminal. In order to reduce latency, compared to the LTE, the RLC in the NR does not allow the data to be in-order delivered to a higher protocol layer.

4) Medium-Access Control (MAC): The MAC is configured for multiplexing logical channels, hybrid automatic repeat-request (HARQ) and scheduling functions related to scheduling. The scheduling functions for an uplink and a downlink reside in the network device. The MAC provides services to the RLC in a form of logical channels. The NR changes a header structure of the MAC, such that a low latency processing can be supported more efficiently, compared to the LTE.

5) Physical Layer (PHY): The PHY is configured for coding and decoding, modulation, demodulation, multi-antenna mapping and other typical physical layer functions. The PHY provides services to the MAC layer in a form of transmission channels.

For example, three IP packets are provided: a packet 1, a packet 2 and a packet 3. The packet 1 and the packet 2 are on one radio bearer a, and the packet 3 is on another radio bearer b. The SDAP maps the IP packets to various bearers. The packet 1 and the packet 2 are mapped to the radio bearer a, and the packet 3 is mapped to the radio bearer b. In general, a data entity derived from or going to a higher protocol layer may be referred to as a service data unit (SDU), and a data entity derived from or going to a lower protocol layer may be referred to as a protocol data unit (PDU). Therefore, an output from the SDAP is an SDAP PDU, which may be equivalent to a PDCP SDU.

The PDCP performs (optional) IP header compression for each radio bearer and encryption. It may be determined whether or not a PDCP header is to be added based on configuration. Header information includes information required for the terminal to perform decryption and a serial number for retransmission and in-order delivery. An output from the PDCP is forwarded to the RLC.

If required, the RLC segments the PDCP PDU and add a RLC header. The RLC header includes a serial number for a retransmission processing. Unlike the LTE, the RLC in the NR does not provide the in-order delivery services to the higher protocol layer, since a mechanism or reordering may cause additional latency, and the latency may be harmful to a service that requires very low latency. If the in-order delivery services to the higher protocol layer is indeed required, the PDCP layer may provide the in-order delivery.

The RLC PDU may be sent to the MAC layer. The MAC layer may multiplex various RLC PDUs and add a new MAC header to form a new transmission block. The physical layer provides services to the MAC layer in a form of a transmission channel. The transmission channel is defined by a way and a property that the information is transmitted through a radio interface. The data on the transmission channel is organized into transmission blocks. During each transmission time interval (TTI), maximum one transmission block, whose size is dynamically variable, is sent to or from the terminal via the radio interface.

In order to support priority processing, the MAC layer can multiplex various logical channels onto one transmission channel. Each logical channel has its own RLC entity. At a receiver side, the MAC layer is configured for demultiplexing correspondingly, and forwarding the RLC PDU to a respective RLC entity. In order to support demultiplexing at the receiver side, the MAC header may be used, a subheader for each MAC SDU is placed before the SDU, and the PDU may be pre-processed before a scheduling decision is received. The subheader includes a length (in bytes) of the PDU and a logical channel index (LCID) of a logical channel which receives the RLC PDU. Further, the subheader may include a reserved bit for demand or to be used in the future.

Dual connectivity: For a terminal that is about to communicate, at least one connection needs to be established between the terminal and the network. The terminal is connected to at least one cell that processes all uplink and downlink transmissions of the terminal. All data flows, including user data and radio resource control (RRC) signaling, are processed by the cell. In some cases, however, dual connectivity (DC) is required between the terminal and the network. The dual connectivity means that one terminal is connected to two cells, and that is, the terminal is connected to the network via a plurality of cells. For example, in a case of user-plane aggregation, data flows from a plurality of cells are aggregated together to improve a data rate. In another example, in a case of a control plane being separated from the user plane, communication and signaling of the control plane is processed by one node, and data of the user plane is processed by another node, such that the data rate may be improved.

In the following, an implementation environment involved in the embodiments of the present disclosure will be described in brief.

FIG. 1 is a schematic view of a communication system according to an embodiment of the present disclosure. The communication system may include: a remote terminal 130, a relay terminal 120 and a network device 110. The network device may be connected to the relay terminal 120 via a Uu interface. The remote terminal 130 and the relay terminal 120 may be connected via a PC5 interface. One or more relay terminals 120 may be arranged. When more than one relay terminals 120 are arranged, two of the more than one relay terminals 120 may be connected with each other via the PC5 interface.

The network device 110 may be a device that communicates with the relay terminal 120 (or referred to as a communication terminal, a terminal). The network device 110 may provide communication coverage for a specific geographical region and may communicate with a relay terminal located within the coverage region. Alternatively, the network device 110 may be an evolutionary node device (eNB or eNodeB) in an LTE system, or a radio controller in a cloud radio access network (CRAN). Alternatively, the network device may be a mobile switching center, a relay station, an access point, an in-vehicle device, a wearable device, a hub, a switch, a bridge, a router, a network device in a 5G network or a network device in a future communication system, and so on.

The relay terminal 120 is a terminal deployed in a communication system to provide relay services for communication between the remote terminal and the network device. A communication process between the remote terminal 130 and the relay terminal 120 may be as follows. The remote terminal 130 sends a relay PDU to the relay terminal. The relay terminal receives the relay PDU and forwards the relay PDU to the network device 110. In this case, the transmission of the relay PDU is an uplink transmission. Alternatively, the communication process between the remote terminal 130 and the relay terminal 120 may be as follows. The network device 110 sends the relay PDU to the relay terminal. The relay terminal receives the relay PDU and forwards the relay PDU to the remote terminal 130. In this case, the transmission of the relay PDU is a downlink transmission.

The remote terminal 130 and the relay terminal 120 may include various devices having the communication function, such as handheld devices, in-vehicle devices, wearable devices, computing devices or other processing devices connected to a wireless modem with wireless communication capabilities, and user devices in various forms, mobile stations (MS), terminal devices, and so on.

Technical solutions of the present disclosure can be applied to various communication systems, such as a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, an Advanced long Term Evolution (LTE-A) system, a New Radio (NR) system, an evolutionary system for the NR system, a LTE-based access to Unlicensed spectrum system, a Universal Mobile Telecommunication System (UMTS), a Worldwide Interoperability for Microwave Access (WiMAX) communication system, a Wireless Local Area Network (WLAN), a Wireless Fidelity (WiFi), a Next Generation Communication System or other communication systems.

In general, a traditional communication system supports a limited number of connections, and the connections may be achieved easily. However, as communication technology evolves, the mobile communication system supports not only the traditional communication system, but also, such as, a Device to Device (D2D) communication, a Machine to Machine (M2M) communication, a Machine Type Communication (MTC), a Vehicle to Vehicle (V2V) communication and a Vehicle to Everything (V2X) system. Embodiments of the present disclosure can also be applied to these communication systems.

Alternatively, Device to Device (D2D) communication between relay terminals 120 may be achieved by means of sidelink.

Alternatively, Device to Device (D2D) communication between the remote terminal 130 and the relay terminal 120 may be achieved by means of sidelink.

Alternatively, the 5G communication system or the 5G network may also be referred to as a New Radio (NR) system or a NR network.

FIG. 1 illustrates one network device, two relay terminals and four remote terminals.

Alternatively, the communication system 100 may include a plurality of network devices and various numbers of terminals located within a coverage region of each of the plurality of network devices. The present disclosure does not limit the number of devices.

Alternatively, the communication system 100 may further include other network entities, such as a network controller, a mobile management entity, and so on, which will not be limited by the present disclosure.

It shall be understood that, a device having a communication function in the network/system in the present disclosure may be referred to as a communication device. Taking the communication system 100 illustrated in FIG. 1 as an example, communication devices may include the network device 110 having the communication functions, the relay terminals 120 having the communication functions and the remote terminals 130 having the communication functions. Each of the network device 110, the relay terminals 120 and the remote terminals 130 may be a device as described in the above and will not be repeated here. The communication devices may further include other devices in the communication system 100, such as the network controller, the mobile management entity, and other network entities, which are not limited by the present disclosure.

Based on the communication system described above, according to the method provided in the present disclosure, the remote terminal is connected to the network device via one or more relay terminals. The remote terminal and the relay terminal, or one relay terminal and another relay terminal may be connected to each other via the PC5 interface of a Third Generation Partnership Project (3GPP) system. The relay terminal which is directly connected to the network device is connected and communicates via the Uu interface of the 3GPP system. Each of the remote terminal, the relay terminal and the network device includes a relay protocol stack. The relay PDU between the remote terminal and the network device may be relayed through the relay protocol stack.

For example, the relay protocol stack may be an additional protocol stack. For example, for the remote terminal, a relay protocol stack included in the remote terminal is located between the PDCP layer and a layer 2 protocol stack of the PC5 interface. For the network device, a relay protocol stack included in the network device is located between the PDCP layer and a layer 2 protocol stack of the Uu interface. For the relay terminal, a relay protocol stack included in the relay terminal is located between the PDCP layer and a layer 2 protocol stack. In addition, when the relay terminal interacts with such the network device, the layer 2 protocol stack includes the layer 2 protocol stack of the Uu interface. When one relay terminal interacts with another relay terminal, or when the relay terminal interacts with the remote terminal, the layer 2 protocol stack includes the layer 2 protocol stack of the PC5 interface. That is, when the communication device adjacent to the relay terminal is the remote terminal, the relay protocol stack included in the relay terminal is a located between the PDCP layer and the layer 2 protocol stack of the PC5 interface. When the communication device adjacent to the relay terminal is the network device, the relay protocol stack included in the relay terminal is located between the PDCP layer and the layer 2 protocol stack of the Uu interface. In addition, in an example, the layer 2 protocol stack includes, but is not limited to, an RLC layer protocol stack and a MAC layer protocol stack.

Figure 2:
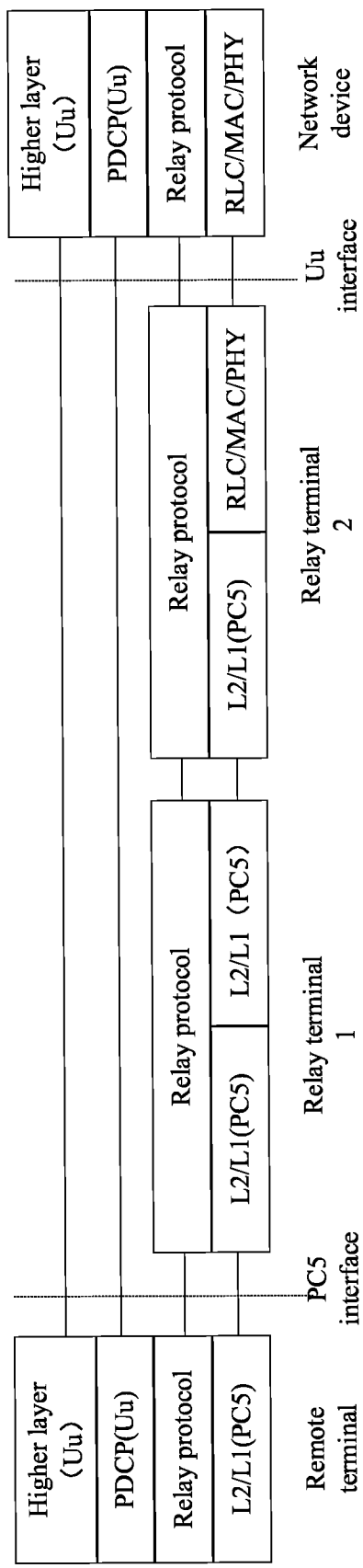
FIG. 2 is a diagram of a system having a relay protocol stack according to an embodiment of the present disclosure.

FIG. 2 is a diagram of a system having a relay protocol stack according to an embodiment of the present disclosure. A protocol stack from the remote terminal to the network device is a PDCP protocol layer of the 3GPP Uu interface and other protocol layers above the PDCP protocol layer. The other protocol layers include other user-plane protocol layers, such as a SDAP protocol layer and an IP protocol layer, and other control-plane protocol layers, such as a RRC and Non-Access Stratum (NAS) protocol layer. Each of a protocol stack from the remote terminal to the relay terminal and a protocol stack from one relay terminal to another relay terminal is a protocol stack of a L2/L1 layer of the 3GPP PC5 interface. The relay protocol layer as described in the present disclosure is configured between the PDCP protocol layer and the Layer 2 protocol layer of the PC5 interface.

As another example, for any of the remote terminal, the relay terminal and the network device, the relay protocol stack may be the MAC layer protocol stack of the communication device.

The relay protocol stack includes a relay receiver entity and a relay sender entity. The relay receiver entity and the relay sender entity may be integrally referred to as a relay protocol entity. Functions of the relay protocol entity include: generating a routing table, forwarding a packet whose destination identifier is not for the instant node, and processing a packet whose destination identifier is for the instant node or is a broadcast identifier. When the relay protocol entity receives an SDU that is required to be sent by the PDCP layer of the 3GPP Uu interface, a relay protocol PDU may be generated. The relay sender entity of the relay terminal forwards the relay PDU to a next node, regardless of the relay PDU being generated based on the PDCP layer or the relay PDU being sent from an adjacent node.

To be noted that, when a plurality of relay terminals are arranged between the remote terminal and the network device, the relay terminal may also be the remote terminal at the same time. As an example, as shown in FIG. 2, the relay terminal 1 may communicate with the network device via a relay terminal 2. In this case, the relay terminal 1 serves as the remote terminal for the relay terminal 2.

For example, FIG. 2 illustrates two relay terminals as an example, which does not limit the scope of the present disclosure. The relay method of the present disclosure is applicable to a communication system including one or more relay terminals.

To be noted that, in the communication system, the relay terminal may be referred to as a parent node of the remote terminal, and the remote terminal may be referred to as a child node of the relay terminal. When the remote terminal itself is converted into the relay terminal, the parent-child relationship remains unchanged. For example, the communication system includes the remote terminal, the relay terminal 1, the relay terminal 2, and the network device. When these communication devices are connected in sequence, the remote terminal is a child node of the relay terminal 1, the relay terminal 1 is a child node of the relay terminal 2, and the relay terminal 2 is a child node of the network device. It can be understood that, the network device is a parent node of the relay terminal 2, the relay terminal 2 is a parent node of the relay terminal 1, the relay terminal 1 is a parent node of the remote terminal. The parent-child relationship remains unchanged during communication processes. All parent nodes and child nodes are informed of respective identifiers at the time the parent-child relationship is established. When an identifier of one of the nodes changes, the node may notify all adjacent nodes to perform updating, such that each node may update the generated routing table autonomously.

Each remote terminal and each relay terminal has a unique identifier. In an uplink direction (a direction from the remote terminal to the network device), a protocol header of the relay PDU includes at least a source identifier. That is, the source identifier in the protocol header of the relay PDU is not null. In this case, content of the source identifier is a terminal identifier of the remote terminal. In a downlink direction (a direction from the network device to the remote terminal or to the relay terminal), the protocol header of the relay PDU includes at least a destination identifier. That is, the destination identifier in the protocol header of the relay PDU is not null. In this case, content of the destination identifier is a network device identifier of the network device. In addition, the protocol header of the relay PDU may further include a radio bearer identifier or a logical channel identifier. For example, the radio bearer identifier may be a SRB ID or a DRB ID. In general, more than one radio bearers may be established on the above-mentioned PC5 interface or the Uu interface.

In the uplink direction, the relay PDU may include signaling or a data packet associated with a remote terminal. In the downlink direction, the relay PDU may include, in addition to the signaling or the data packet associated with the remote terminal, broadcast signaling or broadcast data, such as system messages and so on.

In addition, in a process that the remote terminal sends the relay PDU to the network device through the relay terminal, or in a process that the network device sends the relay PDU to the remote terminal through the relay terminal, the relay PDU may have various formats. A relay PDU format in the present disclosure may include but not limited to following two formats. The present disclosure will describe the two relay PDU formats as an example.

In an embodiment, the relay PDU format may be a format 1 as described below.

The relay PDU may include at least: the terminal identifier, the radio bearer identifier or the logical channel identifier.

Depending on an origin of the relay PDU, the terminal identifier may be interpreted in various ways. For example, when the relay PDU is from the child node, the terminal identifier included in the relay PDU may be interpreted as the source identifier. That is, the content of the source identifier of the relay PDU protocol header is the terminal identifier. Further, the destination identifier of the relay PDU protocol header may be null. When the relay PDU is from the parent node, the terminal identifier included in the relay PDU may be interpreted as the destination identifier. That is, in this case, the content of the destination identifier of the relay PDU protocol header is the terminal identifier.

In other words, when the relay PDU is generated at the instant node, the source identifier is filled in with a node identifier of the instant node before the relay PDU is sent to the parent node. For example, for the remote terminal, in a process of generating the relay PDU, the source identifier of the protocol header of the relay PDU is filled in with the terminal identifier of the remote terminal. When the relay PDU is sent to the child node, the destination identifier is filled in with the terminal identifier of a target child node. For example, the target child node is the remote terminal, that is, when the network device generates the relay PDU, the destination identifier in the protocol header of the relay PDU is filled in with the terminal identifier of the remote terminal.

In addition, when the relay PDU is sent from the network device to the remote terminal, a certain number of bits may be reserved for representing the broadcast identifier. In this case, the relay PDU includes broadcast data or broadcast signaling. In this case, the relay PDU is transmitted to all connected relay terminals and remote terminals. A bit position corresponding to the broadcast identifier cannot be occupied by a node identifier of the remote terminal, a node identifier of the relay terminal or a node identifier of the network device. As shown in FIG. 3, FIG. 3 is a schematic view of a relay PDU format according to an embodiment of the present disclosure, where the R bit is a reserved bit.

Further, when the relay terminal, which is directly connected to the network node, is connected to the network device via dual connection, the relay PDU may further include an indication. The indication is configured to indicate a cell group in which a PDCP entity of the radio bearer between the relay terminal and the network device are configured. That is, a destination of the relay PDU being a master cell group (MCG) and a destination of the relay PDU being a secondary cell group (SCG) may be distinguished based on the indication.

In another embodiment, the relay PDU format may be a format 2 as described below.

The relay PDU may include: the terminal identifier, the network device identifier, the radio bearer identifier or the logical channel identifier.

In this case, neither the source identifier nor the destination identifier of the protocol header of the relay PDU is null. For example, when the relay PDU is sent from the remote terminal to the network device, the source identifier in the protocol header of the relay PDU is the terminal identifier, and the destination identifier is the network device identifier. When the relay PDU is sent from the network device to the remote terminal, the source identifier in the protocol header of the relay PDU is the network device identifier, and the destination identifier is the terminal identifier.

After the relay protocol layer receives the relay PDU, the relay protocol layer may determine the original of the relay PDU based on the source identifier included in the relay PDU. That is, the relay protocol layer may determine whether the relay PDU is sent by the network device or by the remote terminal. The relay protocol layer may determine where the relay PDU needs to be sent to based on the destination identifier included in the relay PDU. That is, the relay protocol layer may determine whether the relay PDU needs to be sent to the network device or to the remote terminal.

Similarly, when the relay PDU is sent from the network device to the remote terminal, a certain number of bits may be reserved for representing the broadcast identifier. In this case, the relay PDU includes broadcast data or broadcast signaling. In this case, the relay PDU is transmitted to all connected relay terminals and remote terminals. The bit position corresponding to the broadcast identifier cannot be occupied by the node identifier of the remote terminal, the node identifier of the relay terminal or the node identifier of the network device.

FIG. 4 is a schematic view of another relay PDU format according to an embodiment of the present disclosure, where the R bit indicates a reserved bit. The source identifier and the destination identifier are the only node identifiers of the remote terminal or network device. In addition, the network device identifier may be a separated reserved identifier or an identifier generated based on a global base station identifier, or all or some of bit information of a global cell identifier.

To be noted that, while transmitting the relay PDU, the relay PDU may be generated in either the format 1 or the format 2 as described above.

According to the above PDU format generation method, next, working principles of the relay receiver entity and the relay sender entity included in the relay protocol layer will briefly described.

The working principle of the relay receiver entity is as follows.

For each received relay PDU, which is sent from the remote terminal, the relay PDU generated by means of the relay PDU format 1 will be described as an example. According to the relay PDU format 1, the relay receiver entity may obtain the terminal identifier, the radio bearer identifier or the logical channel identifier, and the indication and the PDCP PDU. All parts, except the PDCP PDU, are configured in the protocol header of the relay PDU.

Processing performed on the terminal identifier:

When the terminal identifier is absent from a downlink routing table generated by the relay terminal, the terminal identifier is configured as a destination identifier in a reversed direction. A first routing relationship is established in the downlink routing table. The first routing relationship includes the terminal identifier and the node identifier of a prior node. The first routing relationship is a routing relationship defining the terminal identifier as the destination identifier. When the prior node is the remote terminal, the first routing relationship includes correspondence between one terminal identifier and another terminal identifier. For example, when the terminal identifier is RMUE, and the prior node is the remote terminal, a routing record (RMUE, RMUE) is added to the downlink routing table.

To be noted that, when the relay PDU is generated by means of the relay PDU format 1, the relay receiver entity may obtain, in addition to the above information, the destination identifier. For example, the destination identifier may be the network device identifier.

For each received relay PDU, which is sent from the network device, the relay receiver entity receives at least the destination identifier, the radio bearer identifier or the logical channel identifier, and the PDCP PDU, based on the relay PDU format 1 or the relay PDU format 2. All parts, except the PDCP PDU, are configured in the protocol header of the relay PDU.

Processing performed on the destination identifier:

When the destination identifier and the node identifier of the instant node are the same, or when the destination identifier is reserved for the broadcast data or the broadcast signaling, the instant node needs to process the relay PDU. Therefore, the radio bearer identifier and the PDCP PDU are submitted to an upper layer protocol, or the logical channel identifier and the PDCP PDU are submitted to the upper layer protocol.

When the destination identifier is not the same as the node identifier of the instant node, the destination identifier needs to be forwarded to the relay PDU. Therefore, based on the destination identifier, the relay PDU is forwarded to a next node. Alternatively, when the destination identifier is reserved for the broadcast data or the broadcast signaling, the relay receiver entity itself needs to receive the relay PDU, and the relay PDU further needs to be delivered to the relay sender entity in the relay stack. The relay receiver entity sends the relay PDU to all the child nodes connected to the relay terminal.

The working principle of the relay sender entity is as follows.

When the instant node needs to generate the relay PDU, the upper layer protocol passes information required for generating the relay PDU to the relay protocol layer. All of the PDCP PDU, the source identifier, the destination identifier, the radio bearer identifier and the cell group identifier may be transmitted to the relay sender entity of the relay protocol stack. The relay sender entity generates the relay PDU by means of the relay PDU format 1 or the relay PDU format 2.

Processing for the relay PDU: Regardless of the relay PDU being generated by the relay sender entity or the relay PDU being obtained from the relay receiver entity, the relay sender entity may query based on an existing routing table (including the uplink routing table or the downlink routing table) to obtain the destination identifier of the next node. When the destination identifier is null, the relay PDU is forwarded to a default next node. When the destination identifier is not null, a node corresponding to the destination identifier is determined to be the next node, and the relay PDU is forwarded to the determined next node.

Further, when the protocol header of the relay PDU includes the indication configured to indicate the cell group, only the relay terminal directly connected to the network device needs to determine to transmit the relay PDU to the MCG or to the SCG based on the indication. That is, other relay terminals between the remote terminal and the network device do not need to pay attention to the indication.

As described in the above, based on the protocol system including the relay protocol stack shown in FIG. 2, the relay protocol stack on the remote terminal, the relay protocol stack on the relay terminal and the relay protocol stack on the network device are illustrated. Further, the processes of receiving and sending the relay PDU based on the relay protocol stack are illustrated. Next, the relay method and the method for generating the routing table provided in the present disclosure will be described in detail by referring to the accompanying drawings.

Figure 5:
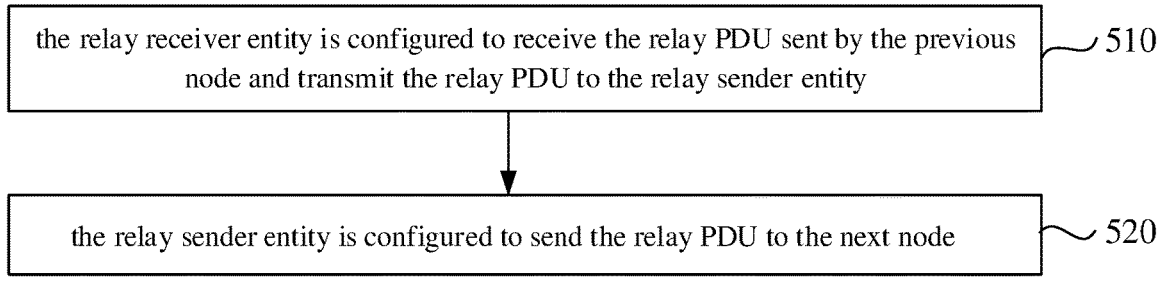
FIG. 5 a flow chart of a relay method according to an embodiment of the present disclosure.

FIG. 5 a flow chart of a relay method according to an embodiment of the present disclosure. The relay method may be applied in the communication system shown in FIG. 1 and may substantially be performed by the relay terminal 130. The relay method may include at least some of the following operations.

In an operation 510, the relay receiver entity is configured to receive the relay PDU sent by the prior node and transmit the relay PDU to the relay sender entity.

The relay PDU includes a first relay PDU and/or a second relay PDU. The first relay PDU is sent from the remote terminal to the network device, and the second relay PDU is sent from the network device to the remote terminal. Alternatively, the second relay PDU is broadcast by the network device.

In an operation 520, the relay sender entity is configured to send the relay PDU to the next node.

The next node may be the network device, another relay terminal or the remote terminal.

To be noted that after the connection is established, a parent-child node relationship is also established between the network device, the relay terminal and the remote terminal. The parent-child node relationship remains unchanged. The next node may be the parent node of the relay terminal based on the parent-child node relationship in the communication system. For example, the next node may be the network device or the relay terminal, or the child node of the relay terminal, such as the remote terminal or the relay terminal.

According to the previous description, the transmitted relay PDU may have two formats. When the relay PDU is in the format 1 as shown in FIG. 3, this operation may include following features.

When the relay PDU is transmitted in a direction the remote terminal to the network device, the relay PDU is the first relay PDU. The protocol header of the first relay PDU includes: the terminal identifier of the remote terminal, and the terminal identifier is the source identifier (Source ID) of the first relay PDU.

When the relay PDU is transmitted from the network device to the remote terminal, the relay PDU is the second relay PDU. The protocol header of the second relay PDU includes: the terminal identifier of the remote terminal, and the terminal identifier is the destination identifier (Destination ID) of the second relay PDU.

Alternatively, the protocol header of the second relay PDU further includes the broadcast identifier, and the broadcast identifier is the destination identifier of the second relay PDU.

In this case, the second relay PDU includes the broadcast data or the broadcast signaling. In this case, all connected relay terminals and/or remote terminals are required to receive and process the second relay PDU.

Alternatively, the protocol header of the second relay PDU further includes: the source identifier. The source identifier is the network device identifier of the network device. In this way, the second PDU may be determined as coming from the network device based on the source identification.

When the relay PDU is in the format 2 as shown in FIG. 4, this operation may include following features.

When the relay PDU is transmitted in a direction from the remote terminal to the network device, the relay PDU is the first relay PDU. The protocol header of the first relay PDU includes: the terminal identifier of the remote terminal, and the terminal identifier is the source identifier of the first relay PDU. In addition, the protocol header of the first relay PDU further includes: the network device identifier of the network device, and the network device identifier is the destination identifier of the first relay PDU.

Similarly, when the relay PDU is transmitted in a direction from the network device to the remote terminal, the relay PDU is the second relay PDU. The protocol header of the second relay PDU includes: the network device identifier of the network device, and the network device identifier is the source identifier of the second relay PDU. In addition, the protocol header of the second relay PDU includes: the terminal identifier of the remote terminal, and the terminal identifier is the destination identifier of the second relay PDU.

When taking the format 2 to configure the relay PDU, the protocol header of the relay PDU includes not only the source identifier but also the destination identifier. Therefore, the relay terminal does not need to determine the transmission direction of the relay PDU when the relay terminal is receiving the relay PDU, and the relay terminal sends the relay PDU to a node indicated by the destination identifier in the protocol header.

In an example, when the relay protocol stack is configured between the PDCP layer and the layer 2 protocol stack, the protocol header of the first relay PDU further includes: the radio bearer identifier, and the radio bearer identifier is the identifier of the radio bearer between the remote terminal and the network device.

As an example, when the relay protocol stack is the MAC layer protocol stack, the first relay PDU further includes: the logical channel identifier.

In order to expand the coverage of the wireless network, it may be common that a plurality of remote terminals may communicate with the network device through one relay terminal. That is, one network device accesses the plurality of remote terminals through one relay terminal. In this case, when the network device receives the relay PDU sent from the remote terminal, the network device needs to determine exactly which remote terminal sends the relay PDU. However, when the remote terminal communicates with the network device indirectly, a plurality of radio bearers may be established based on various data packets or a transmission efficiency and other demands. Each of the plurality of radio bearers has a corresponding radio bearer identifier. Therefore, the protocol header of the first relay PDU may further include the radio bearer identifier. The network device may determine which remote terminal sends the relay PDU based on the radio bearer identifier, improving effectiveness of communication.

The radio bearer may be a SRB or a DRB. Since the first remote terminal is in a Sidelink communication mode, the SRB is a sidelink signal radio bearer (SL SRB), and the DRB is a sidelink data radio bearer (SL DRB). The radio bearer identifier corresponding to the SL SRB is a SL SRB ID, and the radio bearer identifier corresponding to the SL DRB is a SL DRB ID. When the relay protocol stack is configured between the PDCP layer and the layer 2 protocol stack of the PC5 interface, the destination of the relay PDU (i.e. the network device) may distinguish various radio bearers corresponding to various remote terminals based on the above-mentioned radio bearer identifiers.

In addition, the radio bearer identifier may also be an LCID. The LCID is an identifier configured to distinguish logical channels between the MAC layer and the RLC layer. When the relay protocol stack is achieved in the MAC layer, the PDCP PDU in the MAC layer is multiplexed, and the logical channel identifier LCID is associated to a front of the PDCP PDU. The destination of the relay PDU (i.e. network device) may distinguish the radio bearers corresponding to various remote terminals through the above logical channel.

Alternatively, due to a possibility of dual connectivity (DC) being present between the relay terminal and the network device, in an example, the first relay PDU may further include indication information. The indication information is configured to indicate the cell group in which the PDCP entity of the radio bearer between the relay terminal and the network device are configured.

In another embodiment, the cell group identifier may be included in the network device identifier. That is, when the protocol header of the first relay PDU includes the network device identifier, the network device identifier may further include the cell group identifier. The cell group identifier is configured to indicate the cell group in which the PDCP entity of the radio bearer between the relay terminal and the network device are configured.

The cell group may be either the master cell group (MCG) or the secondary cell group (SCG).

To be noted that, before an RRC reconfiguration process, an uplink message is routed to the MCG by default. After the RRC reconfiguration process, some PDCP entities of the radio bearer are configured on the MCG, and some PDCP entities are configured on the SCG. When generating the relay PDU, and when the remote terminal determines that a radio bearer is routed to the MCG based on the configuration information on the RRC reconfiguration message, an identifier configured to indicate the MCG is marked in the protocol header of the relay PDU or in the terminal device. When the remote terminal determines that a radio bearer is routed to the SCG, an identifier configured to indicate the SCG is marked in the protocol header of the relay PDU or in the terminal device.

Next, the process of transmitting the relay PDU will be described. According to the embodiment shown in FIG. 5, the prior node may be the remote terminal, alternatively, the prior node may be another relay terminal that is located between the relay terminal and the remote terminal.

In this case, the relay PDU is the first relay PDU. The relay receiver entity of the relay terminal is further configured to: establish a first routing relationship in the downlink routing table when the downlink routing table does not include the routing relationship corresponding to the terminal identifier. The first routing relationship includes the terminal identifier and the node identifier of the prior node. The first routing relationship is a routing relationship defining the terminal identifier as the destination identifier.

Figure 6:
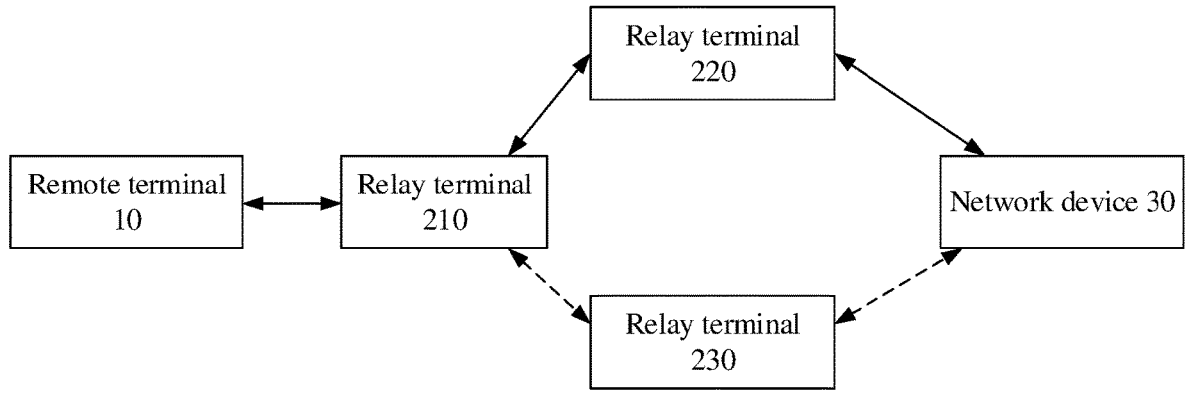
FIG. 6 is a schematic view of a process of transmitting a relay PDU according to an embodiment of the present disclosure.

When the downlink routing table does not include the routing relationship corresponding to the terminal identifier, the relay receiver entity establishes the first routing relationship in the downlink routing table. In this way, when the relay terminal receives the second relay PDU whose source identifier is the terminal identifier, the relay terminal may determine how to transmit the second relay PDU. For example, as shown in FIG. 6, in the process of transmitting the relay PDU as shown in FIG. 6, the first routing relationship is the routing relationship when the terminal identifier is taken as the destination identifier. That is, in the downlink routing table, for the relay terminal 220, the destination identifier in the first routing relationship is the terminal identifier of the remote terminal 10, and the prior node is the relay terminal 210.

In an example, a format of the downlink routing table is shown in Table 1. The relay terminal may determine a table of the identifier of the next node based on the destination identifier.

TABLE 1

| Destination identifier | Next node identifier |
| --- | --- |

In an example, in the process of transmitting the relay PDU shown in FIG. 6, the identifier of the remote terminal 10 is RMUE_1, the identifier of the relay terminal 210 is RLUE_1, and the identifier of the relay terminal 220 is RLUE_2. When PC5 connection is established between the remote terminal 10 and the relay terminal 210, the remote terminal 10 may be informed that the identifier of the relay terminal 210 is RLUE_1. When the remote terminal 10 wants to send a first signaling through the relay terminal 210, the remote terminal 10 may take the identifier of the remote terminal 10 (RMUE_1) as the source identifier and writes the source identifier in the protocol header of the first relay PDU.

After receiving the first relay PDU, the relay terminal 210 may determine that the first relay PDU is a relay PDU sent by a new remote terminal in response to realizing that a routing relationship corresponding to the source identifier is not included in the downlink routing table. That is, the remote terminal has not previously established a connection with the relay terminal, and therefore, the routing relationship does not have the routing relationship that takes the terminal identifier of the remote terminal as the destination identifier. Therefore, the relay terminal 210 takes the source identifier included in the protocol header of the first relay PDU as the destination identifier in the reversed direction in response to the downlink routing table not including the terminal identifier included in the protocol header of the received first relay PDU, and the relay terminal 210 adds a routing record to the downlink routing table. That is, the first routing relationship is established, as shown in Table 2.

TABLE 2

| Destination identifier | Next node identifier |
| --- | --- |
| RMUE_1 | RMUE_1 |

In this way, when a second relay PDU is received in the downlink direction, and when the destination identifier in the second relay PDU is RMUE_1, the next node may be determined based on the first routing relationship in the Table 2.

In another example, for the relay terminal 220, the relay terminal 220 adds a routing record to the downlink routing table of the relay terminal 220 according to the same method. That is, the first routing relationship is established, as shown in Table 3.

TABLE 3

| Destination identifier | Next node identifier |
| --- | --- |
| RMUE_1 | RLUE_1 |

Further, an implementation of the relay sender entity sending the first relay PDU to the next node may include: the relay sender entity being configured to send the first relay PDU to a default next node.

In an embodiment, a target destination identifier in the first relay PDU is null. In this case, the relay terminal may transmit the first relay PDU by following a default path.

In an embodiment, the default next node may include more than one nodes. In this case, the default next node may be determined based on a selection policy. The selection policy may be set based on actual demands. For example, when the remote terminal connected to the default next node is less than a target value, the relay terminal is determined as the next node. The target value may be set according to the actual demands.

For example, as shown in FIG. 6, next nodes of the relay terminal 210 include the relay terminal 220 and the relay terminal 230. In this case, the relay terminal 210 may determine the default next node based on the selection policy.

To be noted that, the above selection policy may be determined based on a communication status between the relay terminal and the network device. A relay terminal having a best communication status may be determined as the next node. The present disclosure does not limit the selection policy.

In another embodiment, the destination identifier in the first relay PDU is not null. In this case, the relay terminal may determine the next node based on the destination identifier.

Further, when the destination identifier in the first relay PDU is not null, i.e., when the protocol header of the first relay PDU includes the network device identifier, the relay sender entity is further configured to establish a second routing relationship in the uplink routing table. The second routing relationship includes the network device identifier and the node identifier of the next node. The second routing relationship is a routing relationship defining the network device identifier as the destination identifier.

In an example, when the destination identifier included in the protocol header of the first relay PDU is the network device identifier of the network device, the relay sender entity queries to determine whether the uplink routing table includes the routing relationship which takes the network device identifier as the destination identifier based on the network device identifier.

When the corresponding routing relationship is present, the first relay PDU is sent to the next node indicated by the next node identifier in the routing relationship.

When the network device identifier is taken as the destination identifier, and when the corresponding routing relationship is absent, the relay sender entity of the relay terminal may transmit the first relay PDU through the default path.

The default next node may include more than one node. In this case, the default next node may be determined based on the selection policy. The selection policy may be set according to actual demands. For example, when the remote terminal connected to the default next node is less than the target value, the relay terminal is determined as the next node. The target value may be set according to the actual demands.

For example, as shown in FIG. 6, next nodes of the relay terminal 210 include the relay terminal 220 and the relay terminal 230. In this case, the relay terminal 210 may determine the 220 to be the default next node based on the selection policy.

The relay terminal not only sends the first relay PDU to the next node, but also establishes the second routing relationship. For example, when determining the relay terminal 220 to be the next node, a second routing relationship as shown in Table 4 is established.

According to the process of transmitting the relay PDU shown in FIG. 6, the network device identifier of network device 30 is BS_ID, and the second routing relationship is the routing relationship in the uplink routing table. In an example, when the destination identifier is the network device identifier, the relay terminal 210 establishes the second routing relationship in the uplink routing table, as shown in Table 4 below.

TABLE 4

| Destination identifier | Next node identifier |
|---|---|
| BS_ID | RLUE_2 |

In an embodiment based on FIG. 5, a prior node may be the network device, alternatively, the prior node of the relay terminal may be another relay terminal that is arranged between the network device and the relay terminal.

The relay receiver entity is further configured to: determine the first routing relationship corresponding to the terminal identifier from the downlink routing table based on the terminal identifier in the protocol header of the second relay PDU; and determine a node indicated by the node identifier corresponding to the terminal identifier in the first routing relationship to be the next node.

Based on the process of transmitting the relay PDU shown in FIG. 6, the identifier of the network device 30 is BS_ID, and the first routing relationship is the routing relationship in the downlink routing table. In an example, the first routing relationship is shown in Table 5 below. The terminal identifier in the protocol header of the second relay PDU is RMUE_1. The node identifier corresponding to the identifier RMUE_1 is determined to be RLUE_2 based on the first routing relationship as shown in Table 5, and in this way, the next node is the relay terminal 220 indicated by RLUE_2.

TABLE 5

| Destination identifier | Next node identifier |
|---|---|
| RMUE 1 | RLUE_2 |

In some embodiments, the second relay PDU includes a reference identifier and the PDCP PDU. The reference identifier includes the radio bearer identifier or the logical channel identifier. When the protocol header of the second relay PDU further includes the broadcast identifier, the relay receiver entity is further configured to submit the reference identifier and PDCP PDU in the second relay PDU to the upper layer.

The second relay PDU is sent from the network device to the remote terminal. When the protocol header of the second relay PDU further includes the broadcast identifier, the second relay PDU needs to be sent to each terminal that communicates directly or indirectly with the network device. Therefore, for the relay terminal, after the relay receiver entity receives the second relay PDU, the relay receiver entity may forward the second relay PDU to the second relay PDU and further submit the PDCP PDU and the reference identifier in the second relay PDU to the upper layer. In this way, the upper layer may obtain the broadcast data or the broadcast signaling of the system which is sent from the network device.

The relay method provided in the present embodiment is applied in the relay terminal. The relay terminal includes the relay protocol stack. The relay protocol stack is configured between the PDCP layer and the layer 2 protocol stack. Alternatively, the relay protocol stack is the protocol stack of the MAC layer. The relay protocol stack includes the relay receiver entity and the relay sender entity. The relay receiver entity is configured to receive the PDU sent by the prior node and transmit the relay PDU to the relay sender entity. The relay sender entity is configured to send the relay PDU to the next node. In this way, between the remote device and the network device, the relay terminal including the relay protocol stack can independently determine the next node of the relay PDU, such that the relay PDU may be relayed from one end to another end, and the mapping relationship between the radio bearer and the remote terminal identifier does not need to be configured by the network device. In this way, the routing process of the relay PDU may be more flexible.

Figure 7:
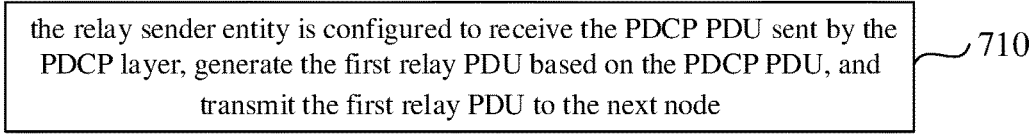
FIG. 7 is a flow chart of a relay method according to another embodiment of the present disclosure.

FIG. 7 is a flow chart of a relay method according to another embodiment of the present disclosure. The relay method can be applied in the communication system shown in FIG. 1. The method may be performed mainly by the remote terminal 120. The relay method may include at least some of the following operations.

In an operation 710: the relay sender entity is configured to receive the PDCP PDU sent by the PDCP layer, generate the first relay PDU based on the PDCP PDU, and transmit the first relay PDU to the next node.

The first relay PDU is the relay PDU sent by the remote terminal to the network device.

In some embodiments, the relay stack further includes the relay receiver entity. In an embodiment based on FIG. 7, the above method further includes following operations. The relay receiver entity is configured to receive the second relay PDU from the prior node. The second relay PDU is a relay PDU sent from the network device to the remote terminal. Alternatively, the second relay PDU is broadcasted by the network device.

In an example, the second relay PDU includes the reference identifier and the PDCP PDU. The reference identifier includes the radio bearer identifier or the logical channel identifier.

In an example, the above method further includes following operations. The relay receiver entity is further configured to submit the second relay PDU including the reference identifier and the PDCP PDU to the upper layer, when the relay receiver entity determines that the destination identifier in the protocol header of the second relay PDU is the same as the identifier of the instant terminal.

To be noted that when the remote terminal receives the second relay PDU, the remote terminal may determine in advance whether the received second relay PDU is sent to the instant the remote terminal. When the received second relay PDU is sent to the instant the remote terminal, the relay receiver entity receives the second relay PDU and submits the reference identifier and the PDCP PDU included in the second relay PDU to the upper layer for processing. When the received second relay PDU is not sent to the instant the remote terminal, the remote terminal may directly discard the second relay PDU without submitting the second relay PDU to the upper layer for processing.

In an example, the above method further includes following operations. The second relay PDU includes the reference identifier and the PDCP PDU. The method further includes following operations. The relay receiver entity is further configured to submit the reference identifier and PDCP PDU included in the second relay PDU to the upper layer in response to the protocol header of the second relay PDU being determined as including the broadcast identifier.

By determining in advance whether the destination identifier of the second relay PDU is the same as the node identifier of the instant terminal, a data delivery efficiency may be improved, accuracy of data transmission may be ensured, and unnecessary packet processing may be reduced.

In some embodiments, when the relay PDU is generated based on the relay PDU format 1, the protocol header of the first relay PDU includes the terminal identifier of the remote terminal, and the terminal identifier is the source identifier of the first relay PDU.

In some embodiments, when the relay PDU is generated based on the relay PDU format 2, the protocol header of the first relay PDU includes the terminal identifier of the remote terminal, and the terminal identifier is the source identifier of the first relay PDU. In addition, the protocol header of the first relay PDU further includes the network device identifier of the network device, and the network device identifier is the destination identifier of the first relay PDU.

In the relay method, which is provided in the present disclosure and is applied to the remote terminal, the remote terminal includes the relay protocol stack. The relay protocol stack is configured between the PDCP layer and the layer 2 protocol stack of the PC5 interface. Alternatively, the relay protocol stack is the protocol stack of the MAC layer. The relay protocol stack includes the relay sender entity. The relay sender entity is configured to receive the PDCP PDU sent by the PDCP layer, generate the first relay PDU based on the PDCP PDU, and transmit the first relay PDU to the next node. The first relay PDU is the relay PDU sent from the remote terminal to the network device. That is, the remote terminal may independently determine the next node of the first relay PDU, such that the remote terminal may send the first relay PDU to the network device. In this process, the network device does not need to configure the mapping relationship between the radio bearer and the remote terminal identifier, such that the routing process of transmitting the first relay PDU may be more flexible.

Since the relay method in the present disclosure introduces the relay protocol layer in each of the protocol stack of the remote terminal and the protocol stack of the network device, operations of the method applied to various nodes may be substantially the same. Details of implementations may be referred to the embodiments of the relay method applied in the relay terminals shown in FIG. 5, and will not be repeated herein.

Figure 8:
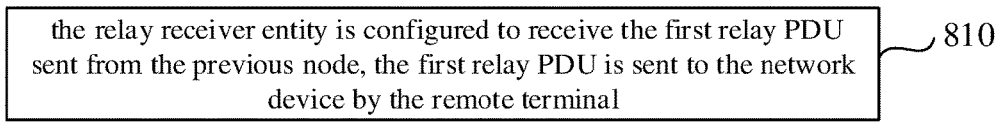
FIG. 8 is a flow chart of a relay method according to still another embodiment of the present disclosure.

FIG. 8 is a flow chart of a relay method according to still another embodiment of the present disclosure. The relay method may be applied in the communication system shown in FIG. 1 and is performed mainly by the network device 110. The relay method may include at least some of the following operations.

In an operation 810, the relay receiver entity is configured to receive the first relay PDU sent from the prior node, the first relay PDU is sent to the network device by the remote terminal.

In some embodiments, when the relay protocol stack is configured between the PDCP layer and the layer 2 protocol stack, the protocol header of the first relay PDU further includes the radio bearer identifier, and the radio bearer identifier is the identifier of the radio bearer between the remote terminal and the network device.

When the relay protocol stack is the protocol stack of the MAC layer, the first relay PDU further includes the logical channel identifier.

In some embodiments, when the destination identifier of the first relay PDU is not null, the relay receiver entity is further configured to submit the PDCP PDU and the radio bearer identifier included in the first relay PDU to the upper layer in response to the destination identifier of the first relay PDU being the same as the identifier of the instant terminal.

In some embodiments, when the destination identifier of the first relay PDU is null, the relay receiver entity is further configured to submit the PDCP PDU and the radio bearer identifier included in the first relay PDU to the upper layer or submit the PDCP PDU and the logical channel identifier included in the first relay PDU to the upper layer.

In some embodiments, the relay protocol stack further includes the relay sender entity. The above method further includes following operations. The relay sender entity is configured to receive the PDCP PDU sent by the PDCP layer, generate the second relay PDU based on the PDCP PDU, and transmit the second relay PDU to the next node.

The second relay PDU is the relay PDU sent from the network device to the remote terminal. Alternatively, the second relay PDU is broadcasted by the network device.

In some embodiments, the protocol header of the second relay PDU further includes the terminal identifier of the remote terminal, and the terminal identifier is the destination identifier of the second relay PDU.

In some embodiments, the second relay PDU further includes the broadcast identifier, and the broadcast identifier is configured to indicate that the second relay PDU includes the broadcast data or the broadcast signaling.

According to the relay method, which is provided in the present disclosure and is applied to the network device, the network device includes the relay protocol stack. The relay protocol stack is configured between the PDCP layer and the layer 2 protocol stack of the Uu interface. Alternatively, the relay protocol stack is the protocol stack of the MAC layer. The relay protocol stack includes the relay receiver entity. The relay receiver entity is configured to receive the first relay PDU from the prior node. The first relay PDU is sent from the remote terminal to the network device. The relay sender entity is configured to receive the PDCP PDU sent by the PDCP layer, generate the second relay PDU based on the PDCP PDU, and transmit the second relay PDU to the next node. The network device may independently determine the next node of the second relay PDU, such that the network device may send the second relay PDU to the remote terminal. In this process, the network device does not need to configure in advance the relationship between the radio bearer and the remote terminal identifier, such that the routing process of transmitting the second relay PDU may be more flexible.

According to the relay method of the present disclosure, the relay protocol layer is introduced into each of the protocol stack of the remote terminal, the protocol stack of the relay terminal and the protocol stack of the network device. The operations of the method applied to the various node may be substantially the same. Details of implementations may be referred to the embodiments of the relay method applied in the relay terminals shown in FIG. 5, and will not be repeated herein.

Next, a process that the remote terminal communicates with the network device through the relay terminal will be described.

Figure 9:
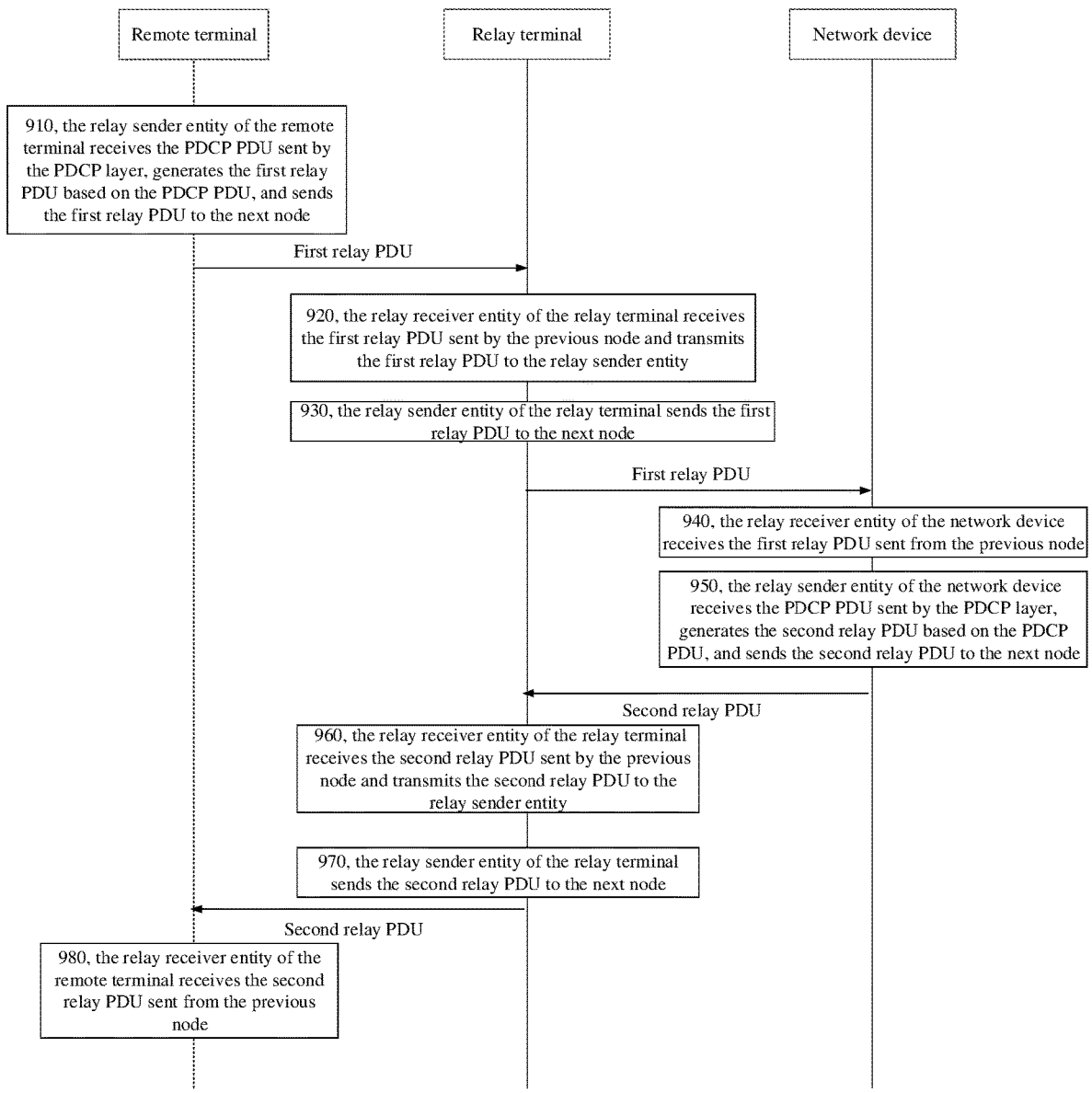
FIG. 9 is a flow chart of a relay method according to still another embodiment of the present disclosure.

FIG. 9 is a flow chart of a relay method according to still another embodiment of the present disclosure. The method is applied in the communication system shown in FIG. 1. The communication system includes the remote terminal, the relay terminal and the network device. The relay method may include at least some of the following operations.

In an operation 910, the relay sender entity of the remote terminal receives the PDCP PDU sent by the PDCP layer, generates the first relay PDU based on the PDCP PDU, and sends the first relay PDU to the next node.

The first relay PDU is the relay PDU sent from the remote terminal to the network device.

In an operation 920, the relay receiver entity of the relay terminal receives the first relay PDU sent by the prior node and transmits the first relay PDU to the relay sender entity.

When the protocol header of the first relay PDU includes the network device identifier, the relay sender entity is configured to establish the second routing relationship in the uplink routing table. The second routing relationship includes the network device identifier and the node identifier of the next node. The second routing relationship is the routing relationship when the network device identifier is taken as the destination identifier. The prior node may be the remote terminal or another relay terminal that is configured between the instant relay terminal and the remote terminal.

In some embodiments, the first relay PDU further includes indication information, the indication information is configured to indicate the cell group in which the PDCP entity of the radio bearer between the relay terminal and the network device is located. The cell group includes the MCG or the SCG.

In some embodiments, the relay receiver entity is further configured to: establish the first routing relationship in the downlink routing table in response to the downlink routing table not including the routing relationship corresponding to the terminal identifier. The first routing relationship includes the terminal identifier and the node identifier of the prior node. The first routing relationship is the routing relationship when the terminal identifier is taken as the destination identifier.

In an operation 930, the relay sender entity of the relay terminal sends the first relay PDU to the next node.

In an operation 940, the relay receiver entity of the network device receives the first relay PDU sent from the prior node.

To be noted that the relay receiver entity of the network device determines whether the destination identifier of the first relay PDU is null when receiving the first relay PDU. When the destination identifier of the first relay PDU is not null, and when the destination identifier of the first relay PDU is the same as the identifier of the instant terminal, the relay receiver entity submits the PDCP PDU and the radio bearer identifier included in the first relay PDU to the upper layer.

In addition, after receiving the first relay PDU, the network device may send to the remote terminal at least one of: a response message including the first relay PDU, the broadcast data, and the broadcast signaling. A downlink routing process may be referred to operations 950 to 980 in the following.

In an operation 950, the relay sender entity of the network device receives the PDCP PDU sent by the PDCP layer, generates the second relay PDU based on the PDCP PDU, and sends the second relay PDU to the next node.

The second relay PDU is a relay PDU sent from the network device to a remote terminal. Alternatively, the second relay PDU is broadcasted by the network device. The next node is a relay terminal that is directly connected to the network device.

In an operation 960, the relay receiver entity of the relay terminal receives the second relay PDU sent by the prior node and transmits the second relay PDU to the relay sender entity. The prior node is the network device. The prior node is another relay terminal configured between the relay terminal and the network device.

To be noted that the relay receiver entity submits the second relay PDU to the upper layer in response to determining that the protocol header of the second relay PDU includes the broadcast identifier.

In an operation 970, the relay sender entity of the relay terminal sends the second relay PDU to the next node.

The next node is the remote terminal. Alternatively, the next node is another relay terminal configured between the relay terminal and the remote terminal.

In an operation 980, the relay receiver entity of the remote terminal receives the second relay PDU sent from the prior node.

To be noted that the relay receiver entity submits the second relay PDU to the upper layer in response to determining that the destination identifier in the protocol header of the second relay PDU is the same as the identifier of the instant terminal.

In some embodiments, the relay receiver entity submits the second relay PDU to the upper layer in response to determining that the protocol header of the second relay PDU includes the broadcast identifier.

In the above-mentioned process of transmitting the relay PDU, to be noted that, it is the first relay PDU that is transmitted in the uplink direction, and it is the second relay PDU that is transmitted in the downlink direction. The first routing relationship is the routing relationship when the terminal identifier is taken as the destination identifier. That is, the first routing relationship is the routing relationship in the downlink transmission. The second routing relationship is the routing relationship when the network device identifier is taken as the destination identifier. That is, the second routing relationship is the routing relationship in the uplink transmission.

In the relay method of the present embodiment, since a new relay protocol layer is introduced into the protocol stacks of the remote terminal, the relay terminal and the network device, the relay protocol stack is configured between the PDCP layer and the layer 2 protocol stack of the PC5 interface. Alternatively, the relay protocol stack is the protocol stack of the MAC layer. The relay protocol stack includes the relay sender entity and the relay receiver entity. The relay receiver entity is configured to receive the relay PDU sent from the prior node and transmit the relay PDU to the relay sender entity. The relay sender entity is configured to send the relay PDU to the next node. The relay PDU includes the first relay PDU and/or the second relay PDU. The first relay PDU is sent from the remote terminal to the network device. The second relay PDU is sent from the network device to the remote terminal. Alternatively, the second relay PDU is broadcasted by the network device. In this way, between the remote terminal and the network device, the relay terminal having the relay protocol stack may independently determine the next node of the relay PDU to successfully relay the relay PDU from one end to another end, and the network device is not required to configure the mapping relationship regarding the radio bearer and the remote terminal identifier, such that the routing process of the relay PDU may be more flexible.

Figure 10:
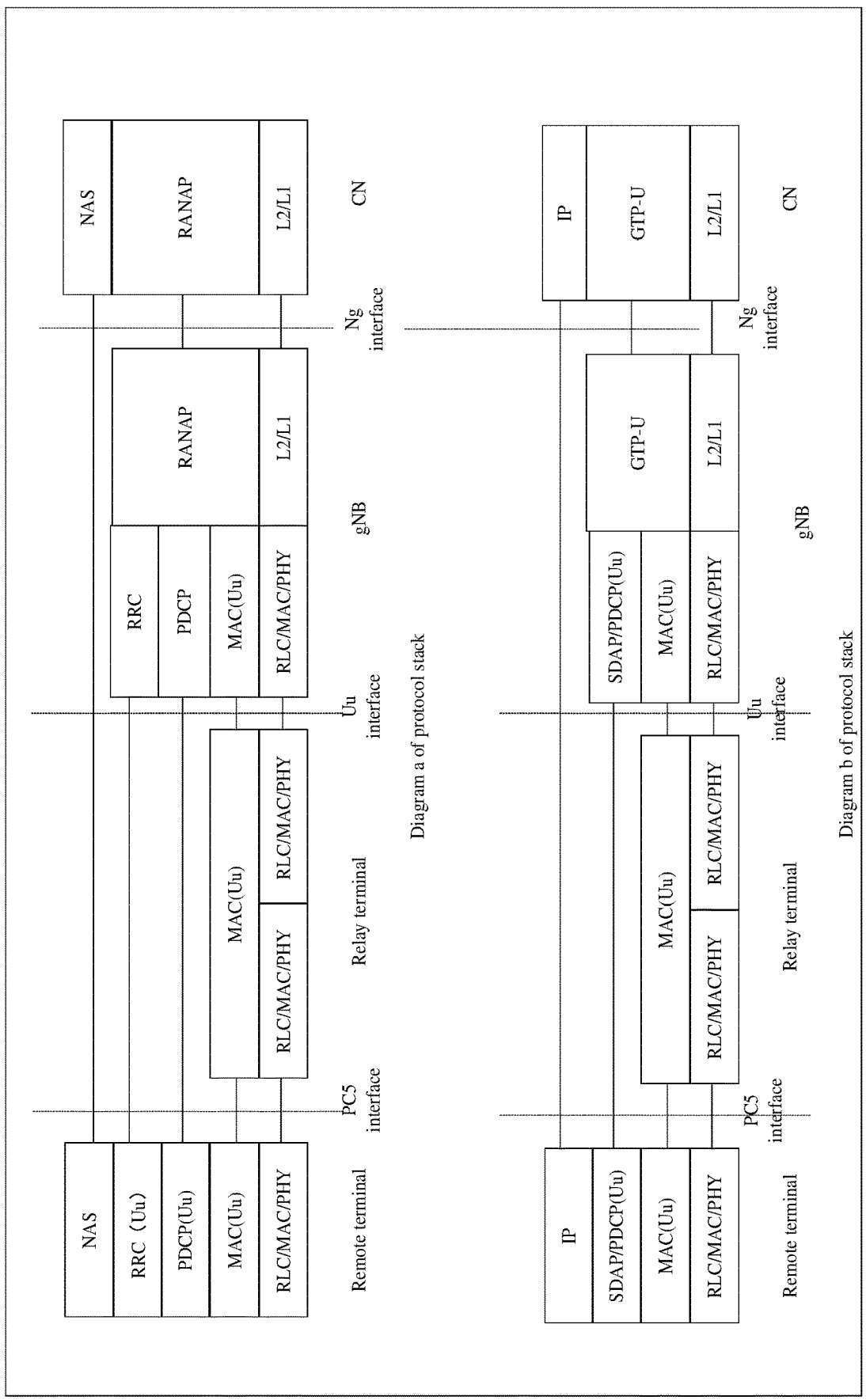
FIG. 10 is a diagram of a system of a protocol stack according to an embodiment of the present disclosure.

In addition, according to the relay method in the present disclosure, the new relay protocol stack may be introduced between the PDCP layer and the layer 2 protocol stack, and functions of the relay protocol may be achieved at the MAC layer. According to a protocol stack shown by system diagram of the protocol stack a in FIG. 10 or a protocol stack shown by system diagram of the protocol stack b in FIG. 10, FIG. 10 is a diagram of a system of a protocol stack according to an embodiment of the present disclosure.

A MAC CE, which is configured to identify a terminal, is introduced in the MAC layer of the Uu interface. The MAC CE may include two types of contents. A first type of content of the MAC CE may be an identifier, which is assigned by a network and is stored in the terminal before the terminal is connected to the network. The identifier may be STMSI of a NAS layer, I-RNTI or a random number. Alternatively, the identifier may be a part of the UE identifier, such as a minimum of 16 bits. A second type of content of the MAC CE may be a C-RNTI assigned to the terminal by the network after the UE is connected to the network. The aforementioned terminal may be the remote terminal and the relay terminal.

In addition to taking the content of the MAC CE as the terminal identifier, functions of the relay protocol may be achieved at the MAC layer, and the MAC PDU of one Uu interface may include a plurality of PDCP PDUs. The plurality of PDCP PDUs may belong to various logical channels, and a new protocol layer does not need to be introduced. Functions of the above-mentioned relay protocol layer may be achieved at the MAC layer.

Due to the LCID in the MAC PDU and correspondence between the LCID and the radio bearer, additional DRB ID is not required in the MAC PDU. A mapping relationship between the LCID and the DRB ID is prescribed in an RRC configuration message.

To be noted that, functions of the relay protocol achieved at the MAC layer may include routing establishment and maintenance, and technical solutions of the achievement may be substantially the same as technical solutions of introducing the new relay protocol layer between the PDCP layer and the layer 2 protocol stack of the PC5 interface. While achieving the functions of the relay protocol achieved at the MAC layer, the terminal identifier MAC CE in the MAC PDU is used as the terminal identifier. When the MAC PDU is sent from the child node to the parent node, the terminal identifier MAC CE may be interpreted as the source identifier. When the MAC PDU is sent from the parent node to the child node, the terminal identifier MAC CE may be interpreted as the destination identifier.

Functions of the relay protocol achieved at the MAC layer may include routing establishment and maintenance. Technical solutions of the achievement may refer to introducing the new relay protocol layer between the PDCP layer and the layer 2 protocol stack of the PC5 interface. Details are shown in the flow chart and description of the operations shown in FIGS. 5-9, and will not be repeated herein.

Figure 11:
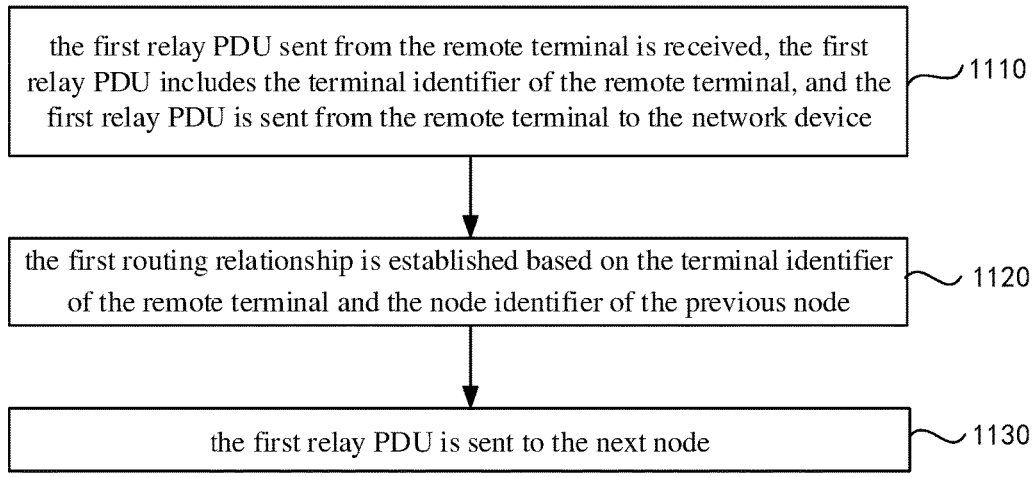
FIG. 11 is a flow chart of a method of generating a routing table according to an embodiment of the present disclosure.

FIG. 11 is a flow chart of a method of generating a routing table according to an embodiment of the present disclosure. The method of generating the routing table may be applied to the relay terminal 120 of the communication system shown in FIG. 1. The method of generating the routing table may include at least some of the following operations.

In an operation 1110, the first relay PDU sent from the remote terminal is received, the first relay PDU includes the terminal identifier of the remote terminal, and the first relay PDU is sent from the remote terminal to the network device.

In an operation 1120, the first routing relationship is established based on the terminal identifier of the remote terminal and the node identifier of the prior node.

The prior node is a prior node of the relay terminal. The prior node may be the remote terminal. Alternatively, the prior node may be another relay terminal configured between the relay terminal and the remote terminal.

In an operation 1130, the first relay PDU is sent to the next node.

The next node is a next node of the relay terminal. The next node is the network device. Alternatively, the next hop node is configured between the relay terminal and the network device. The first routing relationship is the routing relationship when the terminal identifier is taken as the destination identifier.

To be noted that, in the uplink direction, after the first relay PDU is generated based on the relay PDU format 1, in the transmission process, the protocol header of the first relay PDU includes the terminal identifier of the remote terminal. The terminal identifier is the source identifier of the first relay PDU. When the first relay PDU is generated based on the relay PDU format 2, in the transmission process, the protocol header of the first relay PDU includes the terminal identifier and the network device identifier. The terminal identifier is the source identifier of the first relay PDU. The network device identifier is the destination identifier of the first relay PDU. The network device identifier is configured to indicate a network device to which the first relay PDU needs to be transmitted.

Similarly, in the downlink direction, based on embodiments of FIG. 11, the above method further includes following operations. The second relay PDU sent from the network device may be received. The second relay PDU is a relay PDU sent from the network device to the remote terminal. Alternatively, the second relay PDU is broadcasted by the network device. The second relay PDU is sent to the next node based on the destination identifier in the protocol header of the second relay PDU and the first routing relationship. The destination identifier includes the terminal identifier. Alternatively, the destination identifier includes the broadcast identifier.

Figure 12:
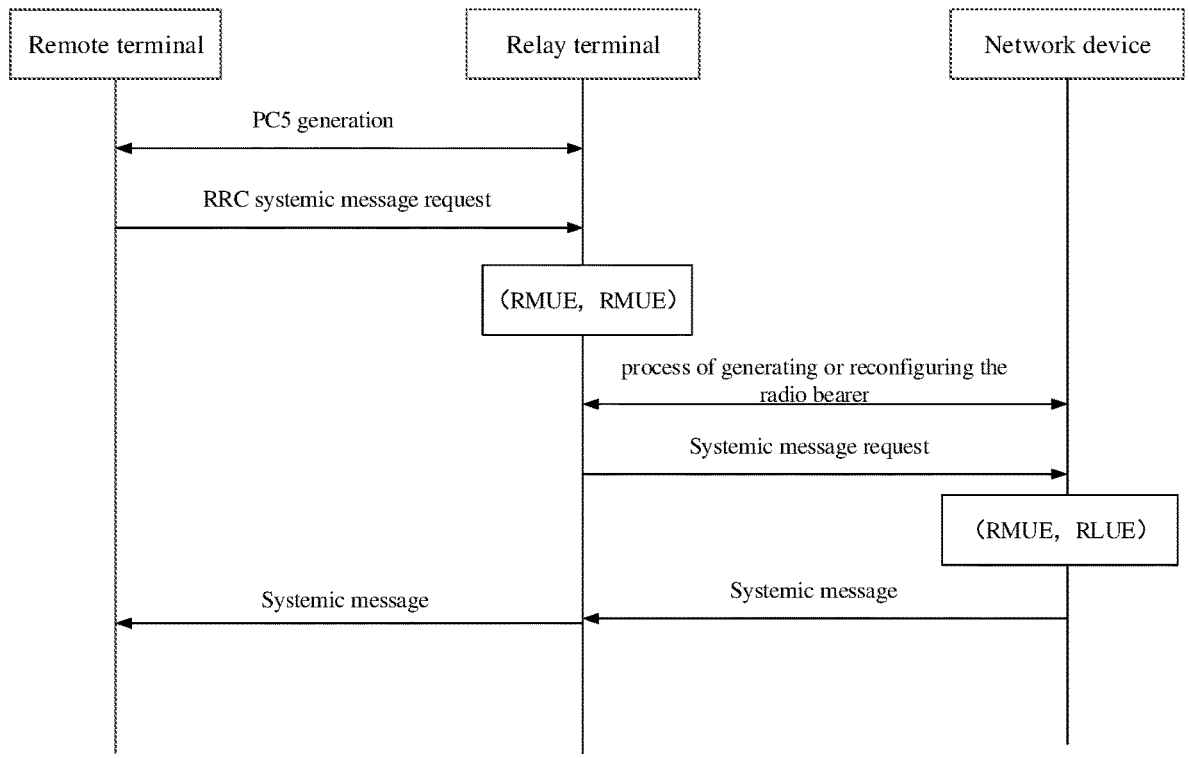
FIG. 12 is a schematic view of a relay process according to an embodiment of the present disclosure.

In an example, as shown in FIG. 12, FIG. 12 is a schematic view of a relay process according to an embodiment of the present disclosure. The method of generating the routing table provided by the present disclosure may be performed to request and forward a system message of the network device. The system message includes the broadcast data or the broadcast signaling.

In the schematic diagram of the relay process shown in FIG. 12, the terminal identifier of the remote terminal is RMUE, the terminal identifier of the relay terminal is RLUE, and the network device identifier of the network device is BS_ID.

The remote terminal detects presence of the relay terminal and wants to receive a broadcast message from a service cell where the relay terminal is located to determine whether the remote terminal can obtain services in the service cell. Therefore, the remote terminal first establishes the PC5 connection with the relay terminal. The remote terminal sends the first relay PDU to the relay terminal. The first relay PDU is an RRC message, and the RRC message is configured to request to receive the system message.

The protocol header of the first relay PDU may include: RMUE.

Alternatively, the protocol header of the first relay PDU may include RMUE and BS_ID. The RMUE is the source identifier of the first relay PDU, and the BS_ID is the destination identifier of the first relay PDU.

The relay terminal establishes the first routing relationship (RMUE, RMUE) based on the source identifier, and completes establishing or reconfiguring the radio bearer for bearing the first relay PDU between the Uu interface and the network device. For the relay terminal, the network device is the only node in the uplink. Therefore, the network device is the default next node, and the relay terminal sends the first relay PDU to the network device.

After receiving the first relay PDU, the network device establishes a third routing relationship (RMUE, RLUE) based on the source identifier in the protocol header of the first relay PDU. The third routing relationship indicates that the second relay PDU sent to the remote terminal RMUE is forwarded through the relay terminal RLUE.

In addition, when the destination identifier included in the first relay PDU is not null, the network device determines whether the first relay PDU is sent to the instant network device based on the destination identifier. In response to the first relay PDU being sent to the instant network device, the network device submits the first relay PDU to an upper layer protocol, such as to the RRC layer.

In the downlink process, the network device may perform a process of sending messages based on the third routing relationship established in the uplink. The uplink routing and the downlink routing are symmetrical.

In an example, the RRC layer of the network device decides, after processing, to transmit the system message to the remote terminal through a dedicated channel. Therefore, the RRC layer of the network device sends the system message to the relay terminal based on the established third routing relationship, i.e. (RMUE, RLUE).

The protocol header of the second relay PDU may include the terminal identifier, and the terminal identifier is the destination identifier of the second relay PDU.

Alternatively, the protocol header of the second relay PDU may include the terminal identifier and the network device identifier. The terminal identifier is the destination identifier of the second relay PDU. The network device identifier is the source identifier of the second relay PDU.

Further, the second relay PDU may include the broadcast identifier. For example, the broadcast identifier may be DESTINATION_BC which is configured to indicate that the second relay PDU includes the broadcast data or the broadcast signaling.

After receiving the second relay PDU, the relay terminal determines that the received second relay PDU is a broadcast message based on the destination identifier. Therefore, the relay terminal transmits the PDCP PDU and the radio bearer identifier (or logical channel identifier) included in the second relay PDU to an RRC layer of the instant relay terminal for processing. At the same time, the relay terminal forwards the second relay PDU to the remote terminal. After receiving the second relay PDU, the remote terminal also determines that the received second relay PDU is the broadcast message based on the destination identifier, and transmits the PDCP PDU and the radio bearer the second relay PDU (or logical channel the second relay PDU) included in the second relay PDU to an RRC layer of the instant remote terminal for processing.

Alternatively, the first relay PDU further includes the radio bearer identifier or the logical channel identifier. The wireless bearer identifier is the identifier of the radio bearer between the remote terminal and the network device.

Alternatively, when functions of the relay protocol are achieved at the MAC layer, the first relay PDU is relayed via the MAC layer.

The parent-child node relationship is present in the communication system, and all parent and child nodes can be informed of respective identifiers when the parent-child relationship is established. Therefore, the parent-child relationship changes, when the connection is interrupted, or a link is changed, and in this case, an original routing table needs to be updated. Therefore, when the node identifier of a node changes, the node may notify all neighboring nodes to perform updating, such that each node may update the established routing table autonomously.

Therefore, in the embodiments based on FIG. 11, when the next node is the network device, the above method further includes following operations.

When the first relay PDU includes a common control channel (CCCH) message, a first Cell Radio-Network Temporary Identifier (C-RNTI) information assigned to the instant node by the network device may be obtained, and the first C-RNTI information may be sent to the prior node.

Since one network device is connected to a plurality of relay terminals, in order to differentiate various relay terminals, after connection between the relay terminal and the network device is established, the network device may assign a new terminal identifier to the accessed relay terminal.

To be noted that, when the relay terminal uses the new terminal identifier assigned by the network device, the relay terminal needs to inform other connected prior nodes about the updated terminal identifier. The prior node may be the remote terminal, or another relay terminal configured between the relay terminal and the remote terminal.

Alternatively, the above method further includes following operations. A second C-RNTI information sent from the remote terminal may be received. The second C-RNTI information is assigned by the network device for the remote terminal. The terminal identifier in the first routing relationship may be updated into the second C-RNTI information.

Similarly, when the terminal identifier of the remote terminal is updated, any relay terminal and any network device communicated with the remote terminal need to be informed, such that the relay terminal and the network device can update the routing table.

Figure 13:
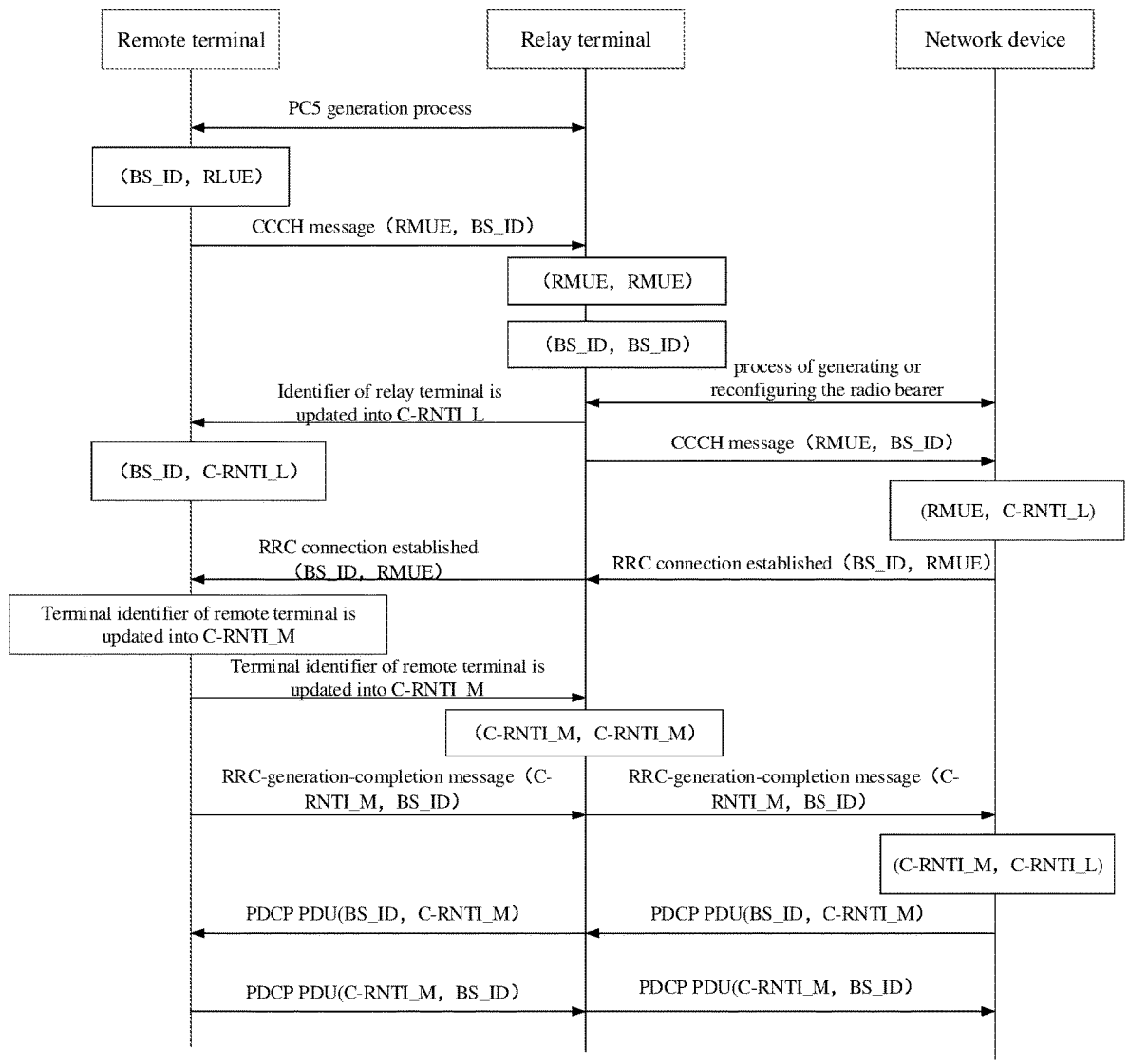
FIG. 13 is a schematic view of a relay process according to another embodiment of the present disclosure.

In an example, FIG. 13 is a schematic view of a relay process according to another embodiment of the present disclosure.

The remote terminal sends the CCCH message to the network to start establishing or to restore the RRC connection as shown in FIG. 12, and the relay terminal is in an idle or inactive state.

The relay process shown in FIG. 13 may explain how the routing table is established while establishing the RRC connection, restoring the RRC connection or reestablishing the RRC connection and how the first relay PDU sent from the remote terminal is forwarded to the network device.

In the diagram of the relay process shown in FIG. 13, an original identifier of the remote terminal is: RMUE. After the RRC connection is established, the network device assigns a new terminal identifier: C-RNTI_M to the remote terminal. An original identifier of the relay terminal is: RLUE. After Uu connection is established between the relay terminal and the network device, the network device assigns a new terminal identifier: C-RNTI_L to the relay terminal. It is assumed that the network device identifier of the network device is: BS_ID.

In the process of establishing the second routing relationship in the uplink, the PC5 connection is established between the remote terminal and the relay terminal. After the PC5 connection is established, the remote terminal may obtain the terminal identifier RLUE of the relay terminal. In this case, the remote terminal records a routing relationship (BS_ID, RLUE), and meaning of the routing relationship is that all relay PDUs sent to the network device need to be sent to any relay terminal having the terminal identifier RLUE.

The remote terminal sends a first relay PDU including the CCCH message to the relay terminal. The protocol header of the first relay PDU may include: RMUE.

Alternatively, the protocol header of the first relay PDU may include RMUE and BS_ID. The RMUE is the source identifier of the first relay PDU, and the BS_ID is the destination identifier of the first relay PDU.

After the relay terminal receives the first relay PDU, the relay terminal establishes the first routing relationship (RMUE, RMUE). Further, the RRC connection between the relay terminal and the network device, and a radio bearer for forwarding the first relay PDU may be established. For the relay terminal, the network device is the only node in the uplink. Therefore, the network device is the default next node. The relay terminal sends the first relay PDU to the network device and establishes the second routing relationship (BS_ID, BS_ID). In addition, after the network device establishes connection with the relay terminal, the network device reassigns a terminal identifier to the relay terminal.

In an example, the network device may assign first C-RNTI information to the relay terminal. For example, the first C-RNTI information is C-RNTI_L. In the schematic diagram of the relay process shown in FIG. 13, the relay terminal updates its own terminal identifier into C-RNTI_L, and informs the remote terminal of the updated terminal identifier. The relay terminal forwards the first relay PDU including the CCCH message to the network device.

After the remote terminal receives the C-RNTI_L sent by the relay terminal, the remote terminal modifies the recorded routing relationship (BS_ID, RLUE) into (BS_ID, C-RNTI_L).

For the network device, it is the first time that the network device receives the relay PDU having the source identifier RMUE, and therefore, a routing record (RMUE, C-RNTI_L) is created. As an example, the network device transmits the CCCH message to the upper RRC protocol layer.

During downlink communication, the network device, after processing the CCCH message, sends a second relay PDU that includes an RRC-connection-establishment message to the relay terminal. The protocol header of the second relay terminal may include the terminal identifier RMUE of the remote terminal. Alternatively, the protocol header of the second relay PDU may include BS_ID and RMUE. The BS_ID is the source identifier of the second relay PDU, and the RMUE is the destination identifier of the second relay PDU.

Alternatively, based on various CCCH messages, the network device may also send other RRC messages, such as an RRC-connection-reestablishment message, or an RRC-restoring message, to the relay terminal.

After receiving the above-mentioned second relay PDU, the relay terminal forwards the second relay PDU to the remote terminal by querying the routing record (RMUE, RMUE).

After receiving the second relay PDU, the remote terminal determines that the second relay PDU is transmitted to the instant remote terminal based on the destination identifier (i.e., RMUE). Therefore, the remote terminal transmits the PDCU and the radio bearer identifier (or logical channel identifier) in the second relay PDU to the RRC layer protocol.

In addition, in the received RRC-connection-establishment message, the network device reassigns a new terminal identifier to the remote terminal. That is, the second relay PDU includes the second C-RNTI information. In an example, the new terminal identifier may be C-RNTI_M.

After processing the RRC message, the RRC layer of the remote terminal transmits the second C-RNTI information to the relay terminal of the prior node via PC5 signaling. After the relay terminal receives the second C-RNTI information, the relay terminal updates the first routing relationship (RMUE, RMUE) into (C-RNTI_M, C-RNTI_M).

In addition, when the network device assigns a new terminal identifier to the remote terminal, the routing of the instant network device also needs to be updated. That is, when the network device next needs to transmit the second relay PDU to the remote terminal in a next time, the corresponding destination identifier RMUE should be updated into C-RNTI_M. That is, when the remote terminal sends the first relay PDU containing a RRC-connection-completion message to the relay terminal, the source identifier included in the first relay PDU is C-RNTI_M, and the destination identifier included in the first relay PDU is BS_ID. The relay terminal sends the first relay PDU to the network device.

After receiving the first relay PDU, the network device establishes the third routing relationship based on the destination identifier. For example, the third routing relationship is (C-RNTI_M, C-RNTI_L). At this stage, routing between the network device and the remote terminal is established.

In an example, after the routing relationship is updated, the source identifier in the protocol header of the second relay PDU transmitted in the downlink is BS_ID, and the destination identifier in the protocol header of the second relay PDU transmitted in the downlink is C-RNTI_M. The source identifier in the protocol header of the first relay PDU transmitted in the uplink is C-RNTI_M, and the destination identifier in the protocol header of the first relay PDU transmitted in the uplink is BS_ID.

To be noted that all relay PDUs in the relay process shown in FIG. 13 are described as the format 2 of the relay PDU. When the relay PDU in the format 1 is applied, the BS_ID may be omitted from the protocol header of the above-mentioned relay PDU. The destination identifier included in the protocol header of the relay PDU is determined based on a direction in which the relay PDU is transmitted.

To summarize, according to the method of generating the routing table provided in the present disclosure, routing relationships may be generated autonomously, and routing relationships may be modified based on terminal identifiers of the relay terminal and the remote terminal connected to the network device through the RRC connection status. Therefore, flexibility of relaying is improved.

Therefore, in the embodiment based on FIG. 11, the first relay PDU further includes indication information, and the indication information is configured to indicate the cell group in which the PDCP entity of the radio bearer between the relay terminal and the network device is located.

Alternatively, the network device identifier further includes a cell group identifier, the cell group identifier is configured to indicate the cell group in which the PDCP entity of the radio bearer between the relay terminal and the network device is located.

Alternatively, the cell group includes the MCG or the SCG.

That is, since dual connectivity may be present between the relay terminal and the network device, while the relay terminal is communicating with the network device, the relay terminal needs to determine which cell group the relay terminal sends the first relay PDU to.

In an example, before the RRC reconfiguration process, an uplink message is routed to the MCG by default. After the RRC reconfiguration process, some of PDCP entities of the DRB are configured on the MCG, and some are configured on the SCG.

During the remote terminal is generating the first relay PDU based on the configuration information on the RRC reconfiguration message, when the first relay PDU is routed to the MCG, an identifier for indicating the MCG may be configured in the protocol header of the first relay PDU. For example, the identifier may be an MCG identifier. When the first relay PDU is routed to the SCG, an identifier for indicating the SCG may be configured in the protocol header of the first relay PDU. For example, the identifier may be an SCG identifier.

Figure 14:
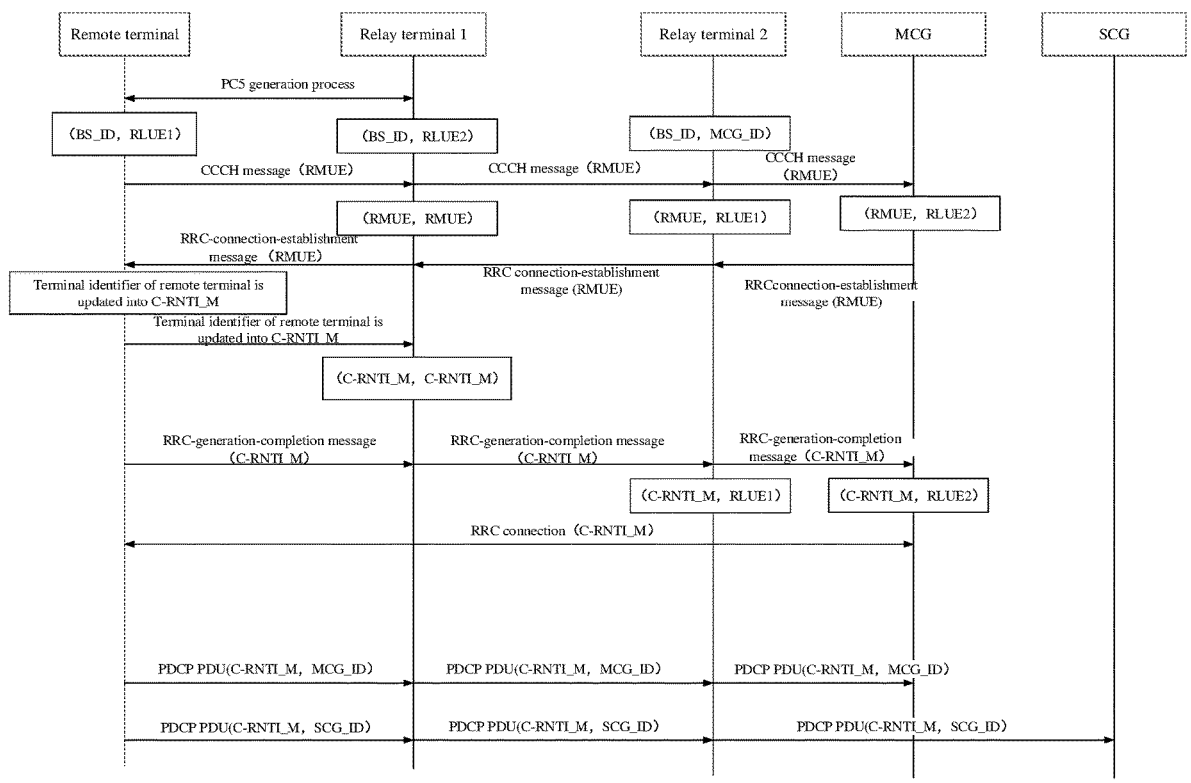
FIG. 14 is a schematic view of a relay process according to still another embodiment of the present disclosure.

FIG. 14 is a schematic view of a relay process according to still another embodiment of the present disclosure.

In the present embodiment, the remote terminal is connected to the network device via two relay terminals, and formats of relay PDUs may be the format 1 and the format 2. The present embodiment will be described by taking the relay PDU format 1 as an example. The present embodiment also applies to the relay PDU format 2, as long as a network device identifier is added to the protocol header of each relay PDU. For example, in the first relay PDU of the uplink transmission, the network device identifier is the destination identifier; and in the second relay PDU for the downlink transmission, the network device identifier is the source identifier.

In the present embodiment, in order to enable the relay terminal 2 to determine how the first relay PDU sent from the remote terminal is routed, indication information is included in the protocol header of the first relay PDU. The indication information is configured to indicate whether the first relay PDU is sent to the MCG or to the SCG.

To be noted that when the indication information is absent, the relay terminal 2 may forward the first relay PDU to the MCG. When the PDCP entity of the radio bearer between the remote terminal and the network device is configured on the MCG (SCG), relay PDUs of the uplink and the downlink may be transmitted between the remote terminal and the MCG (SCG). The routing of the radio bearer is fixed. For example, PDCP entities of SRB0, SRB1 and SRB2 are configured on the MCG, and a PDCP entity of SRB3 is configured on the SCG.

A detailed relay process of the present embodiment may be referred to FIG. 13. A process of generating the routing for the remote terminal may be similar to the process shown in FIG. 13, and will not be repeated herein.

In addition, when the relay PDU is in the format 2, the MCG (SCG) identifier may be used directly for indication. For example, the cell group identifier of the MCG is MCG_ID, and the cell group identifier of the SCG is SCG_ID. The identifiers may be included in the network device identifier. In this way, before the RRC reconfiguration, all signaling and data are default between the remote terminal and the MCG. In the RRC reconfiguration message, the remote terminal sets the destination identifier in the protocol header of the relay PDU of the uplink to be MCG_ID or SCG_ID respectively based on where the PDCP entity is located. The relay terminal 2 needs to determine a correct routing based on the set destination identifier.

Further, the first relay PDU includes a switching message. The switching message is configured to trigger the relay terminal to establish connection with a target cell, and the target cell is a cell after switching.

That is, when the remote terminal has established a wireless link of the Uu interface with a source network device, and as the remote terminal gradually moves out of a coverage area of the source network device, the remote terminal finds another available relay terminal by measurement. Further, the remote terminal sends a measurement report to the source network device, and the remote terminal requests to switch from the Uu interface to a relay link.

FIG. 15 is a schematic view of a relay process according to still another embodiment of the present disclosure. In the present embodiment, the terminal identifier of the remote terminal is C-RNTI_M, the terminal identifier of the relay terminal is C_RNTI_L, and the network device identifier of the network device is BS_ID. As an example, when the remote terminal needs to switch from the Uu interface to the relay link, before sending the measurement report, the remote terminal already knows the target service cell where the relay terminal is located and takes the target service cell as a part of the measurement report to be reported to the source network device.

The source network device and the target network device where the target service cell is located performs interaction of a switch message by following a usual cell switching process, and a switch command is sent to the remote terminal.

Alternatively, in order to reduce a switch delay, before receiving the switch command, the remote terminal may establish the PC5 connection with the relay terminal in advance. After receiving the switch command, the remote terminal sends a first relay PDU including a switch-completion message to the relay terminal. It is assumed that the first relay PDU is generated based on the format 1 described above.

Arrival of the first relay PDU triggers establishment of the RRC connection and the relay radio bearer between the relay terminal and the target network device. The relay terminal adds the routing records, i.e. (BS_ID, BS_ID) and (C-RNTI_M, C-RNTI_M), to the uplink routing table and the downlink routing table respectively. When the relay terminal has already established connection of the Uu interface with the target network device, only the radio bearer that transmits the relay PDU needs to be added, and a new routing relationship does not need to be established.

The relay terminal sends the first relay PDU that includes the switch-completion message to the target network device.

After receiving the first relay PDU, the target network device establishes the third routing relationship (C_RNTI_M, C_RNTI_L).

Alternatively, in order to further reduce the switch delay, connection between the remote terminal and the target network device may be established in advance.

Alternatively, the measurement report may further include indication information. For example, the source network device may be indicated that, while switching to the target network device, the remote terminal needs to indirectly connect to the target network device via a relay terminal. The target network device may optimize content of the switch command based on the indication information. For example, configuration parameters of protocols of the RLC layer and protocols below the RLC layer may be omitted. Further, a duration of switch execution protection may be extended appropriately, such that switching may be protected and completed successfully.

To be noted that, the present embodiment is described by taking the relay PDU format 1 as an example, the method is further applied to the relay PDU format 2. When the relay PDU format 2 is used, the network device identifier BS_ID of the target network device needs to be added as the destination identifier in the relay PDU protocol header of the uplink transmission, and the network device identifier BS_ID of the target network device needs to be added as the source identifier in the relay PDU protocol header of the downlink transmission.

To summarize, according to method of generating the routing table in the present disclosure, when a relay PDU is received or sent, the relay terminal determines the next node of the relay PDU based on the protocol header of the relay PDU and the routing relationship in the routing table. The process of transmitting the relay PDU is more flexible, and a transmission route of the relay PDU may be defined based on the routing table. Therefore, congestion when transmitting data packets through the radio bearer and a packet loss may be alleviated to some extent. The relay may be more flexible and efficient. In addition, the process of generating the routing table is not only applicable to relay terminals, but also applicable to remote terminals and network devices.

FIG. 16 is a flow chart of a method of generating a routing table according to another embodiment of the present disclosure. The method of generating the routing table may be applied to the network device 110 in the communication system shown in FIG. 1. The method of generating the routing table may include at least some of the following operations.

In an operation 1610, the first relay PDU sent from the remote terminal is received. The protocol header of the first relay PDU includes the terminal identifier of the remote terminal, and the first relay PDU is the relay PDU sent by the remote terminal to the network device.

To be noted that, the first relay PDU includes the PDCP PDU and the radio bearer identifier. The radio bearer indicated by the radio bearer identifier is the radio bearer between the remote terminal and the network device. The first relay PDU includes a packet of the radio bearer. Alternatively, the first relay PDU includes the PDCP PDU and the logical channel identifier.

In addition, for the received first relay PDU, when the first relay PDU is in the relay PDU format 1, and when the destination identifier of the first relay PDU is null, the PDCP PDU and the radio bearer identifier are submitted to the upper layer, alternatively, the PDCP PDU and the logical channel identifier are submitted to the upper layer.

For the received first relay PDU, when the first relay PDU is in the relay PDU format 2, when the destination identifier of the first relay PDU is not null, and when the destination identifier of the first relay PDU is the same as the identifier of the instant local terminal, the PDCP PDU and the radio bearer identifier are submitted to the upper layer, alternatively, the PDCP PDU and the logical channel identifier are submitted to the upper layer.

In an operation 1620, the third routing relationship is established, the third routing relationship includes the terminal identifier and the node identifier of the prior node of the network device, and the third routing relationship is the routing relationship when the terminal identifier is taken as the destination identifier.

To be noted that, the third routing relationship is established by the network device. Therefore, in order to distinguish the third routing relationship from the second routing relationship established by the relay terminal, the routing relationship established by the network device is named as the third routing relationship.

The process of establishing the third routing relationship is similar to the process of establishing the first routing relationship and the second routing relationship as described above.

The process of the routing relationship is referred to the flow chart and detailed operations of the method of generating the routing table as shown in FIG. 11, and will not be repeated herein.

To summarize, according to the method of generating the routing table provided in the present disclosure, the first relay PDU sent from the remote terminal is received. The protocol header of the first relay PDU includes the terminal identifier of the remote terminal, the first relay PDU is the relay PDU sent by the remote terminal to the network device. The third routing relationship is generated. The third routing relationship includes the terminal identifier and the node identifier of the prior node of the network device. The third routing relationship is the routing relationship when the terminal identifier is taken as the destination identifier. In this way, in subsequent communication processes, the network device may determine, based on the established third routing relationship, that the second relay PDU will be transmitted through which relay terminal to reach the remote terminal. In this process, the network device is not required to configure the mapping relationship between the radio bearer and the remote terminal identifier in advance, enabling the routing process of transmitting the first relay PDU to be more flexible.

Figure 17:
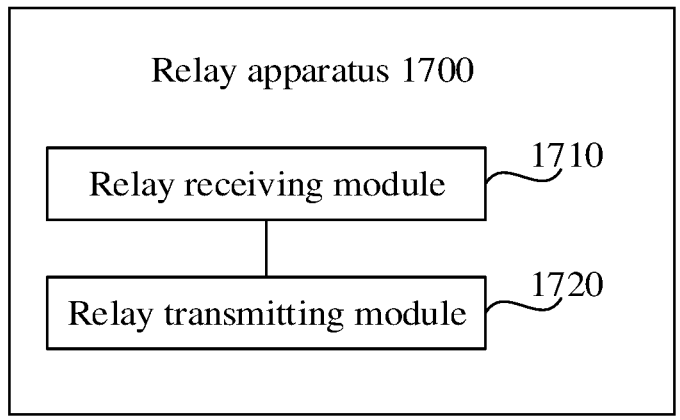
FIG. 17 is a structural schematic view of a relay apparatus according to an embodiment of the present disclosure.

FIG. 17 is a structural schematic view of a relay apparatus according to an embodiment of the present disclosure. The apparatus 1700 may be configured in the relay terminal. The relay apparatus includes the relay protocol stack. The relay protocol stack is configured between the PDCP layer and the protocol stack of the PC5 interface. Alternatively, the relay protocol stack is the protocol stack of the MAC layer. The relay protocol stack includes the relay receiving module 1710 and the relay transmitting module 1720. The apparatus 1700 includes following components.

The relay receiving module 1710 is configured to receive the PDU sent by the prior node and to transmit the relay PDU to the relay transmitting module.

The relay transmitting module 1720 is configured to transmit the relay PDU to the next node.

In some embodiments, the relay PDU includes the first relay PDU. The protocol header of the first relay PDU includes: the terminal identifier of the remote terminal, and the terminal identifier is the source identifier of the first relay PDU.

In some embodiments, the protocol header of the first relay PDU further includes: the network device identifier of the network device, and the network device identifier is the destination identifier of the first relay PDU.

In some embodiments, the relay PDU includes the second relay PDU. The protocol header of the second relay PDU includes: the terminal identifier of the remote terminal, and the terminal identifier is the destination identifier of the second relay PDU.

In some embodiments, the protocol header of the second relay PDU includes: the broadcast identifier, and the broadcast identifier is the destination identifier of the second relay PDU.

In some embodiments, the protocol header of the second relay PDU further includes: the source identifier, and the source identifier is the network device identifier of the network device.

In some embodiments, when the relay protocol stack is configured between the PDCP layer and the layer 2 protocol stack, the protocol header of the first relay PDU further includes: the radio bearer identifier. The radio bearer identifier is the identifier of the radio bearer between the remote terminal and the network device.

When the relay protocol stack is the MAC layer protocol stack, the first relay PDU further includes: the logical channel identifier.

In some embodiments, the first relay PDU further includes the indication information. The indication information is configured to indicate the cell group in which the PDCP entity of the radio bearer between the relay terminal and the network device is located.

In some embodiments, the network device identifier further includes the cell group identifier. The cell group identifier is configured to indicate the cell group in which the PDCP entity of the radio bearer between the relay terminal and the network device is located.

In some embodiments, the cell group includes the MCG or the SCG.

In some embodiments, the prior node is the remote terminal. Alternatively, the prior node is another relay terminal that is arranged between the relay terminal and the remote terminal.

The relay receiving module 1710 is further configured to: establish the first routing relationship in the downlink routing table in response to the downlink routing table not including a routing relationship corresponding to the terminal identifier of the remote terminal. The first routing relationship includes the terminal identifier and the node identifier of the prior node. The first routing relationship is the routing relationship when the terminal identifier is taken as the destination identifier.

In some embodiments, the relay PDU includes the first relay PDU, and the relay transmitting module 1720 is configured to transmit the first relay PDU to the next node. The operation further includes following operations.

The relay transmitting module 1720 is configured to transmit the first relay PDU to the default next node.

In some embodiments, the relay PDU includes the first relay PDU. When the protocol header of the first relay PDU includes the network device identifier, the relay transmitting module 1720 is configured to establish the second routing relationship in the uplink routing table. The second routing relationship includes the network device identifier and the node identifier of the next node. The second routing relationship is the routing relationship when the network device identifier is taken as the destination identifier.

In some embodiments, the relay PDU includes the second relay PDU. The prior node is the network device. Alternatively, the prior node of the relay terminal is another relay terminal that is arranged between the network device and the relay terminal.

The relay receiving module 1710 is further configured to: determine the first routing relationship corresponding to the terminal identifier from the downlink routing table, based on the terminal identifier in the protocol header of the second relay PDU.

The relay receiving module 1710 is further configured to: determine the node, which is indicated by the node identifier corresponding to the terminal identifier in the first routing relationship, as the next node.

In some embodiments, the second relay PDU includes the reference identifier and the PDCP PDU, and the reference identifier includes the radio bearer identifier or the logical channel identifier.

When the protocol header of the second relay PDU also includes the broadcast identifier, the relay receiving module is further configured to submit the reference identifier and the PDCP PDU in the second relay PDU to the upper layer.

In some embodiments, when the relay terminal interacts with the network device, the layer 2 protocol stack includes the layer 2 protocol stack of the Uu interface.

When the relay terminal interacts with another relay terminal, or when the relay terminal interacts with the remote terminal, the layer 2 protocol stack includes the layer 2 protocol stack of the PC5 interface.

In some embodiments, the layer 2 protocol stack includes the protocol stack of the RLC layer and the protocol stack of the MAC layer.

The relay method provided in the present embodiment is applied in the relay terminal. The relay terminal includes the relay protocol stack. The relay protocol stack is configured between the PDCP layer and the layer 2 protocol stack. Alternatively, the relay protocol stack is the protocol stack of the MAC layer. The relay protocol stack includes the relay receiver entity and the relay sender entity. The relay receiver entity is configured to receive the PDU sent by the prior node and transmits the relay PDU to the relay sender entity. The relay sender entity is configured to send the relay PDU to the next node. In this way, between the remote device and the network device, the relay terminal having the relay protocol stack may independently determine the next node of the relay PDU to successfully relay the relay PDU from one end to another end, and the network device is not required to configure the mapping relationship between the radio bearer and the remote terminal identifier in advance, enabling the routing process of the relay PDU to be more flexible.

Figure 18:
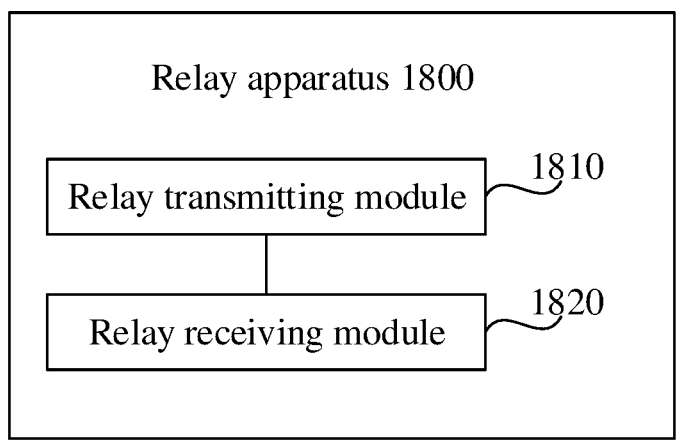
FIG. 18 is a structural schematic view of a relay apparatus according to another embodiment of the present disclosure.

FIG. 18 is a structural schematic view of a relay apparatus according to another embodiment of the present disclosure. The apparatus 1800 may be configured in the remote terminal. The relay device includes the relay protocol stack. The relay protocol stack is configured located between the PDCP layer and the protocol stack of the PC5 interface. Alternatively, the relay protocol stack is the MAC layer protocol stack. The relay protocol stack includes the relay transmitting module 1810. The apparatus 1800 may include following components.

The relay transmitting module 1810 is configured to receive the PDCP PDU sent by the PDCP layer, generate the first relay PDU based on the PDCP PDU, and transmit the first relay PDU to the next node.

The first relay PDU is the relay PDU sent by the remote terminal to the network device.

In some embodiments, the relay stack further includes the relay receiving module 1820. The relay receiving module 1820 is configured to receive the second relay PDU from the prior node. The second relay PDU is the relay PDU sent by the network device to the remote terminal. Alternatively, the second relay PDU is broadcasted by the network device.

In some embodiments, the second relay PDU includes the reference identifier and the PDCP PDU, and the reference identifier includes the radio bearer identifier or the logical channel identifier.

The relay receiving module 1820 is further configured to submit the reference identifier and the PDCP PDU, which are included in the second relay PDU, to the upper layer, in response to determining that the destination identifier in the protocol header of the second relay PDU is the same as the identifier of the local instant terminal.

In some embodiments, the second relay PDU includes the reference identifier and the PDCP PDU, and the reference identifier includes the wireless bearer identifier or the logical channel identifier.

The relay receiving module 1820 is further configured to submit the reference identifier and the PDCP PDU included in the second relay PDU to the upper layer in response to determining that the protocol header of the second relay PDU further includes the broadcast identifier.

In some embodiments, the protocol header of the first relay PDU includes: the terminal identifier of the remote terminal, and the terminal identifier is the source identifier of the first relay PDU.

In some embodiments, the protocol header of the first relay PDU further includes: the network device identifier of the network device.

The network device identifier is the destination identifier of the first relay PDU.

The relay method provided in the present embodiment is applied in the remote terminal. The remote terminal includes the relay protocol stack. The relay protocol stack is configured between the PDCP layer and the layer 2 protocol stack of the PC5 interface. Alternatively, the relay protocol stack is the protocol stack of the MAC layer. The relay protocol stack includes the relay sender entity. The relay sender entity is used to receive the PDCP PDU sent by the PDCP layer, generate the first relay PDU based on the PDCP PDU, and transmit the first relay PDU to the next node. The first relay PDU is the relay PDU sent from the remote terminal to the network device. That is, the remote terminal can independently determine the next node for the first relay PDU to send the first relay PDU to the network device. In this process, the network device is not required to configure the mapping relationship between the radio bearer and the remote terminal identifier, enabling the routing process of transmitting the first relay PDU to be more flexible.

Figure 19:
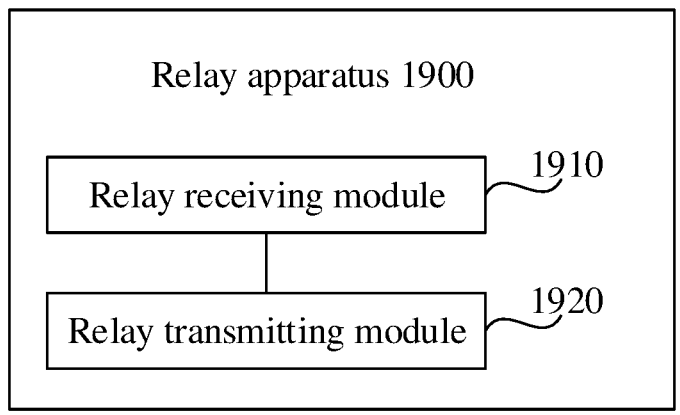
FIG. 19 is a structural schematic view of a relay apparatus according to still another embodiment of the present disclosure.

FIG. 19 is a structural schematic view of a relay apparatus according to still another embodiment of the present disclosure. The apparatus 1900 may be configured in the network device. The relay device includes the relay protocol stack. The relay protocol stack is configured between the PDCP layer and the protocol stack of the PC5 interface. Alternatively, the relay protocol stack is the MAC layer protocol stack. The relay protocol stack includes the relay receiving module 1910 and the relay transmitting module 1920. The apparatus 1900 may include following components.

The relay receiving module 1910 is configured to receive the first relay PDU sent from the prior node, and the first relay PDU is sent from the remote terminal to the network device.

In some embodiments, when the relay protocol stack is configured between the PDCP layer and the layer 2 protocol stack, the protocol header of the first relay PDU further includes: the radio bearer identifier. The radio bearer identifier is the identifier of the radio bearer between the remote terminal and the network device.

When the relay protocol stack is the MAC layer protocol stack, the first relay PDU further includes: the logical channel identifier.

In some embodiments, when the destination identifier of the first relay PDU is not null, the relay receiving module 1910 is further configured to submit the PDCP PDU and the radio bearer identifier included in the first relay PDU to the upper layer in response to the destination identifier of the first relay PDU being the same as the identifier of the local instant terminal.

In some embodiments, when the destination identifier of the first relay PDU is null, the relay receiving module 1910 is further configured to submit the PDCP PDU and the radio bearer identifier included in the first relay PDU to the upper layer, or to submit the PDCP PDU and the logical channel identifier included in the first relay PDU to the upper layer.

In some embodiments, the relay stack further includes the relay transmitting module 1920. The apparatus 1900 further includes following components.

The relay transmitting module 1920 is configured to receive the PDCP PDU sent by the PDCP layer, generate the second relay PDU based on the PDCP PDU, and transmit the second relay PDU to the next node.

The second relay PDU is the relay PDU sent by the network device to the remote terminal, or the second relay PDU is broadcasted by the network device.

In some embodiments, the protocol header of the second relay PDU further includes: the terminal identifier of the remote terminal, and the terminal identifier is the destination identifier of the second relay PDU.

In some embodiments, the second relay PDU further includes the broadcast identifier, and the broadcast identifier is configured to indicate that the second relay PDU includes the broadcast data or the broadcast signaling.

The relay method provided in the present embodiment is applied in the network device. The network device includes the relay protocol stack. The relay protocol stack is configured between the PDCP layer and the layer 2 protocol stack of the Uu interface. Alternatively, the relay protocol stack is the protocol stack of the MAC layer. The relay protocol stack includes the relay receiver entity. The relay receiver entity is configured to receive the first relay PDU sent from the prior node. The first relay PDU is sent from the remote terminal to the network device. The relay sender entity is configured to receive the PDCP PDU sent from the PDCP layer, generate the second relay PDUs based on the PDCP PDU, and transmit the second relay PDU to the next node. The network device can independently determine the next node of the second relay PDU to send the second relay PDU to the remote terminal. In this process, the network device is not required to configure in advance the mapping relationship between the radio bearer and the remote terminal identifier, enabling the routing process of transmitting the second relay PDU to be more flexible.

Figure 20:
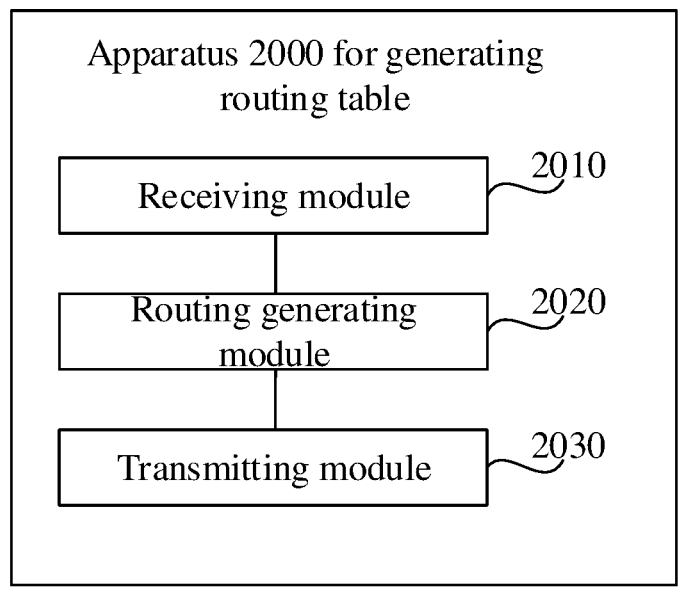
FIG. 20 is a structural schematic view of an apparatus for generating a routing table according to an embodiment of the present disclosure.

FIG. 20 is a structural schematic view of an apparatus for generating a routing table according to an embodiment of the present disclosure. The apparatus 2000 may be configured in the relay terminal. The apparatus 2000 may include following components.

The receiving module 2010 is configured to receive the first relay PDU sent from the remote terminal. The first relay PDU includes the terminal identifier of the remote terminal, and the first relay PDU is sent by the remote terminal to the network device.

A routing establishment module 2020 is configured to establish the first routing relationship based on the terminal identifier of the remote terminal and the node identifier of the prior node. The first routing relationship is the routing relationship when the terminal identifier is taken as the destination identifier.

In some embodiments, the first relay PDU further includes the network device identifier. The network device identifier is the destination identifier of the first relay PDU. The network device identifier is configured to indicate the network device to which the first relay PDU needs to be transmitted.

In some embodiments, the first relay PDU further includes the radio bearer identifier or the logical channel identifier. The radio bearer identifier is the identifier of the radio bearer between the remote terminal and the network device.

In some embodiments, the first relay PDU further includes the indication information. The indication information is configured to indicate the cell group in which the PDCP entity of the radio bearer between the relay terminal and the network device is located.

In some embodiments, the network device identifier further includes the cell group identifier. The cell group identifier is configured to indicate the cell group in which the PDCP entity of the radio bearer between the relay terminal and the network device is located.

In some embodiments, the cell group includes the MCG or the SCG.

In some embodiments, the next node is the network device. The apparatus further includes the transmitting module 2030. The transmitting module 2030 is configured to perform following operations.

When the first relay PDU includes the CCCH message, the transmitting module 2030 is configured to obtain the first C-RNTI information assigned to the instant apparatus by the network device.

The transmitting module 2030 is configured to transmit the first C-RNTI information to the prior node.

In some embodiments, the receiving module 2010 is configured to perform following operations.

The receiving module 2010 is configured to receive the second C-RNTI information sent from the remote terminal. The second C-RNTI information is assigned by the network device to the remote terminal.

The receiving module 2010 is configured to update the terminal identifier in the first routing relationship into the second C-RNTI information.

In some embodiments, the first relay PDU includes a switch message. The switch message is configured to trigger the relay terminal to establish connection with the target cell. The target cell is the cell after switching.

In some embodiments, following operations are included.

The receiving module 2010 is further configured to receive the second relay PDU from the network device. The second relay PDU is the relay PDU sent by the network device to the remote terminal, alternatively, the second relay PDU is broadcasted by the network device.

The transmitting module 2030 is configured to transmit the second relay PDU to the next node based on the destination identifier in the protocol header of the second relay PDU and the first routing relationship.

In some embodiments, the destination identifier includes the terminal identifier. Alternatively, the destination identifier includes the broadcast identifier.

To summarize, according to the method of generating the routing table provided in the present disclosure, when the relay PDU is received or transmitted, the relay terminal determines the next node of the relay PDU based on the protocol header of the relay PDU and the routing relationship in the routing table. The process of transmitting the relay PDU is more flexible, and the transmission route of the relay PDU can be defined based on the routing table. Therefore, congestion when transmitting data packets through the radio bearer and a packet loss may be alleviated to some extent. The relay may be more flexible and efficient. In addition, the process of generating the routing table is not only applicable to relay terminals, but also applicable to remote terminals and network devices.

Figure 21:
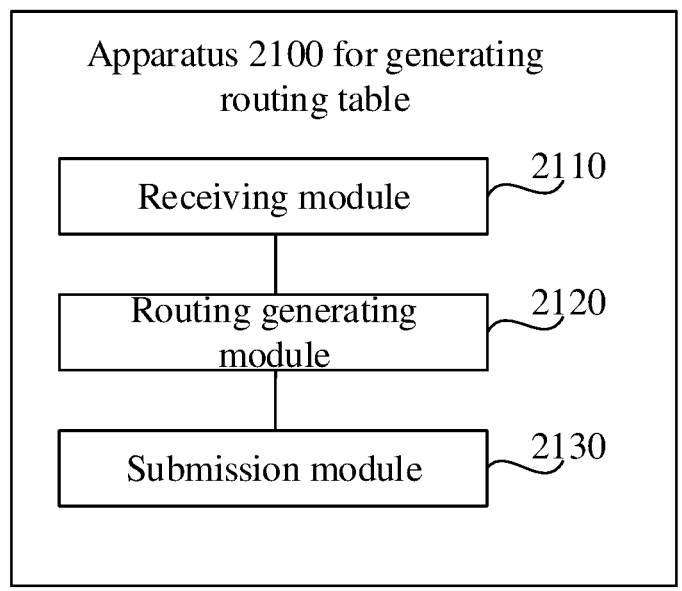
FIG. 21 is a structural schematic view of an apparatus for generating a routing table according to another embodiment of the present disclosure.

FIG. 21 is a structural schematic view of an apparatus for generating a routing table according to another embodiment of the present disclosure. The apparatus 2100 may be configured in the network device, and the apparatus 2100 may include following components.

The receiving module 2110 is configured to receive the first PDU sent from the remote terminal. The protocol header of the first relay PDU includes the terminal identifier of the remote terminal, and the first relay PDU is the relay PDU sent by the remote terminal to the network device.

The routing establishment module 2120 is configured to establish the third routing relationship. The third routing relationship includes the terminal identifier and the node identifier of the prior node of the network device. The third routing relationship is the routing relationship when the terminal identifier is taken as the destination identifier.

In some embodiments, the first relay PDU includes the PDCP PDU and the radio bearer identifier. The radio bearer indicated by the radio bearer identifier is the radio bearer between the remote terminal and the network device. The first relay PDU includes the data packet of the radio bearer. Alternatively, the first relay PDU includes the PDCP PDU and the logical channel identifier.

In some embodiments, the apparatus 2100 further includes following components.

A submission module 2130 is configured to submit the PDCP PDU and the radio bearer identifier to the upper layer or submit the PDCP PDU and the logical channel identifier to the upper layer, in response to the destination identifier of the first relay PDU being null.

In some embodiments, the apparatus 2100 further includes following components:

The submission module 2130 is configured to submit the PDCP PDU and the radio bearer identifier to the upper layer in response to the destination identifier of the first relay PDU being not null and in response to the destination identifier of the first relay PDU being the same as the identifier of the local instant terminal.

To summarize, according to the method of generating the routing table of the present disclosure, the first relay PDU sent from the remote terminal is received. The protocol header of the first relay PDU includes the terminal identifier of the remote terminal, and the first relay PDU is the relay PDU sent by the remote terminal to the network device. The third routing relationship is established. The third routing relationship includes the terminal identifier and the node identifier of the prior node of the network device. The third routing relationship is the routing relationship when the terminal identifier is taken as the destination identifier. In this way, in subsequent communication processes, the network device may determine, based on the established third routing relationship, that the second relay PDU will be transmitted through which relay terminal to reach the remote terminal. In this process, the network device is not required to configure the mapping relationship between the radio bearer and the remote terminal identifier in advance, enabling the routing process of transmitting the first relay PDU to be more flexible.

Figure 22:
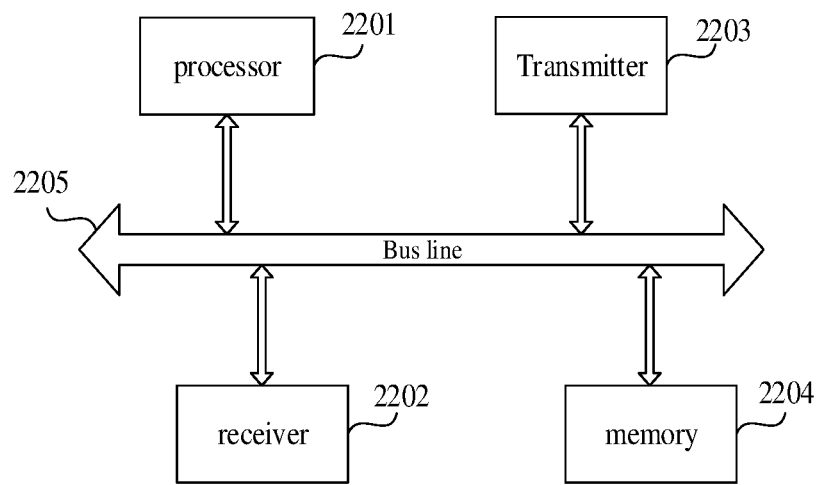
FIG. 22 is a structural schematic view of a communication device according to an embodiment of the present disclosure.

FIG. 22 is a structural schematic view of a communication device (a terminal or a network-accessed device) according to an embodiment of the present disclosure.

The communication device includes: a processor 1201, a receiver 1202, a transmitter 1203, a memory 1204 and a bus 1205.

The processor 1201 includes one or more processing cores. The processor 1201 performs various functional applications and information processing by running software programs and modules.

The receiver 1202 and the transmitter 1203 can be implemented as a communication component, which may be a communication chip.

The memory 1204 is connected to the processor 1201 via the bus 1205.

The memory 1204 may be configured to store at least one instruction, and the processor 1201 is configured to execute the at least one instruction to implement various operations performed by the terminal and the network device in the various method embodiments described above.

In addition, the memory 1204 can be implemented by any type of volatile or non-volatile storage device or a combination thereof. The volatile or non-volatile storage device may include but is not limited to: a disk or an optical disk, an electrically erasable programmable read-only memory (EEPROM), an erasable programmable read-only memory (EPROM), a static readily accessible memory (SRAM), a read-only memory (ROM), a magnetic memory, a flash memory, and a programmable read-only memory (PROM).

The present disclosure provides a computer-readable storage medium. The storage medium has at least one instruction stored therein, and the at least one instruction is loaded and executed by the processor to implement the relay method and the method of generating the routing table provided by the various method embodiments as described above.

The present disclosure further provides a computer program product. When the computer program product is run on a computer, the computer is caused to perform the relay method and the method of generating the routing table provided by the various method embodiments as described above.

Any skilled person in the art shall be aware that, in one or more of the above examples, functions described in the embodiments of the present disclosure may be implemented using hardware, software, firmware, or any combination thereof. When implemented by software, these functions may be stored in a computer-readable medium or transmitted as one or more instructions or codes on a computer-readable medium. Computer-readable media include computer storage media and communication media. The communication media include any medium that facilitates transmission of a computer program from one location to another. The storage medium may be any available medium that is accessible to a general-purpose or dedicated computer.

The foregoing are only some embodiments of the present disclosure and are not intended to limit the present disclosure. Any modifications, equivalent substitutions, improvements, and so on, made within the spirit and principles of the present disclosure shall be included within the scope of the present disclosure.

What is claimed is:

1. A relay method, applied to a relay terminal, wherein the relay terminal comprises a relay protocol stack, the relay protocol stack is configured to be between a packet data convergence protocol (PDCP) layer and a layer 2 protocol stack, and the relay protocol stack comprises a relay receiver entity and a relay sender entity, comprising:
receiving, by the relay receiver entity, a relay protocol data unit (PDU) sent by a prior node, and transmitting, by the relay receiver entity, the relay PDU to the relay sender entity; and
sending, by the relay sender entity, the relay PDU to a next node,
wherein the relay PDU comprises a second relay PDU, and a protocol header of the second relay PDU comprises:
a terminal identifier of a remote terminal, wherein the terminal identifier is a destination identifier of the second relay PDU; and
a radio bearer identifier, wherein the radio bearer identifier is an identifier of a radio bearer between the remote terminal and a network device.

2. The relay method according to claim 1, wherein the relay PDU comprises a first relay PDU, a protocol header of the first relay PDU comprises: a terminal identifier of a remote terminal, and the terminal identifier is a source identifier of the first relay PDU.

3. The relay method according to claim 2, wherein, when the relay protocol stack is configured between the PDCP layer and the layer 2 protocol stack, the protocol header of the first relay PDU further comprises a radio bearer identifier, and the radio bearer identifier is an identifier of a radio bearer between the remote terminal and the network device.

4. The relay method according to claim 1, wherein,
the prior node is a remote terminal, or, the prior node is another relay terminal that is arranged between the relay terminal and the remote terminal; and
the method further comprises:
establishing, by the relay receiver entity, a first routing relationship in a downlink routing table in response to the downlink routing table not comprising a routing relationship corresponding to a terminal identifier of the remote terminal, wherein the first routing relationship comprises the terminal identifier and a node identifier of the prior node, and the first routing relationship is a routing relationship defining the terminal identifier as a destination identifier.

5. The relay method according to claim 4, wherein the relay PDU comprises a first relay PDU, and
the sending, by the relay sender entity, the relay PDU to the next node, comprises:
sending, by the relay sender entity, the first relay PDU to a default next node.

6. The relay method according to claim 4, wherein the relay PDU comprises a first relay PDU, and in response to a protocol header of the first relay PDU comprising a network device identifier of a network device, the method further comprises:
   establishing, by the relay sender entity, a second routing relationship in an uplink routing table, wherein the second routing relationship comprises the network device identifier and a node identifier of the next node, and the second routing relationship is a routing relationship defining the network device identifier as a destination identifier.

7. The relay method according to claim 4, wherein the relay PDU comprises a second relay PDU, and the prior node is a network device, or, the prior node of the relay terminal is another relay terminal that is arranged between the network device and the relay terminal;
   the method further comprises:
   determining, by the relay receiver entity, a first routing relationship corresponding to a terminal identifier in a protocol header of the second relay PDU from a downlink routing table; and
   determining, by the relay receiver entity, a node, which is indicated by a node identifier corresponding to the terminal identifier in the first routing relationship, as the next node.

8. The relay method according to claim 7, wherein the second relay PDU comprises a reference identifier and a PDCP PDU, and the reference identifier comprises a radio bearer identifier or a logical channel identifier; and
   in response to the protocol header of the second relay PDU comprising a broadcast identifier, the relay receiver entity is configured to submit the reference identifier and the PDCP PDU in the second relay PDU to an upper layer.

9. The relay method according to claim 1, wherein,
   when the relay terminal interacts with the network device, the layer 2 protocol stack comprises a layer 2 protocol stack for a Uu interface; and
   when the relay terminal interacts with another relay terminal, or when the relay terminal interacts with the remote terminal, the layer 2 protocol stack comprises a layer 2 protocol stack of a PC5 interface, wherein the layer 2 protocol stack comprises a protocol stack of a radio-link control (RLC) layer and a protocol stack of a medium access control (MAC) layer.

10. A relay terminal, comprising a processor and a memory, wherein the memory stores at least one instruction; the relay terminal comprises a relay protocol stack, the relay protocol stack is configured to be between a packet data convergence protocol (PDCP) layer and a layer 2 protocol stack, and the relay protocol stack comprises a relay receiver entity and a relay sender entity; and
   the at least one instruction is configured to be executed by the processor to cause the relay terminal to implement a relay method, comprising:
   receiving, by the relay receiver entity, a relay protocol data unit (PDU) sent by a prior node, and transmitting, by the relay receiver entity, the relay PDU to a relay sender entity; and
   sending, by the relay sender entity, the relay PDU to a next node,
   wherein the relay PDU comprises a second relay PDU, and a protocol header of the second relay PDU comprises:
   a terminal identifier of a remote terminal, wherein the terminal identifier is a destination identifier of the second relay PDU; and
   a radio bearer identifier, wherein the radio bearer identifier is an identifier of a radio bearer between the remote terminal and a network device.

11. The relay terminal according to claim 10, wherein the relay PDU comprises a first relay PDU, a protocol header of the first relay PDU comprises: a terminal identifier of the remote terminal, and the terminal identifier is a source identifier of the first relay PDU.

12. The relay terminal according to claim 11, wherein,
   when the relay protocol stack is configured between the PDCP layer and the layer 2 protocol stack, the protocol header of the first relay PDU further comprises a radio bearer identifier, and the radio bearer identifier is an identifier of a radio bearer between the remote terminal and the network device.

13. The relay terminal according to claim 10, wherein,
   when the relay terminal interacts with the network device, the layer 2 protocol stack comprises a layer 2 protocol stack for a Uu interface; and
   when the relay terminal interacts with another relay terminal, or when the relay terminal interacts with the remote terminal, the layer 2 protocol stack comprises a layer 2 protocol stack of a PC5 interface, wherein the layer 2 protocol stack comprises a protocol stack of a radio-link control (RLC) layer and a protocol stack of a medium access control (MAC) layer.

14. The relay terminal according to claim 10, wherein the prior node is a remote terminal, or, the prior node is another relay terminal that is arranged between the relay terminal and the remote terminal; and
   the at least one instruction is configured to be executed by the processor to cause the relay terminal to implement an operation of:
   establishing, by the relay receiver entity, a first routing relationship in a downlink routing table in response to the downlink routing table not comprising a routing relationship corresponding to a terminal identifier of the remote terminal, wherein the first routing relationship comprises the terminal identifier and a node identifier of the prior node, and the first routing relationship is a routing relationship defining the terminal identifier as a destination identifier.

15. The relay terminal according to claim 14, wherein the relay PDU comprises a first relay PDU, and
   the at least one instruction is configured to be executed by the processor to cause the relay terminal to implement an operation of:
   sending, by the relay sender entity, the first relay PDU to a default next node.

16. The relay terminal according to claim 14, wherein the relay PDU comprises a first relay PDU, and
   the at least one instruction is configured to be executed by the processor to cause the relay terminal to implement an operation of:
   establishing, by the relay sender entity in response to a protocol header of the first relay PDU comprising a network device identifier of a network device, a second routing relationship in an uplink routing table, wherein the second routing relationship comprises the network device identifier and a node identifier of the next node, and the second routing relationship is a routing relationship defining the network device identifier as a destination identifier.

17. A remote terminal, comprising a processor and a memory, wherein the memory stores at least one instruction; the remote terminal comprises a relay protocol stack, the relay protocol stack is configured to be between a packet data convergence protocol (PDCP) layer and a layer 2 protocol stack, and the relay protocol stack comprises a relay receiver entity; and the at least one instruction is configured to be executed by the processor to cause the remote terminal to implement operations of:

receiving, by the relay receiver entity, a second relay PDU from a prior node, wherein the second relay PDU is a relay PDU sent from a network device to the remote terminal, or the second relay PDU is broadcasted by a network device, and a protocol header of the second relay PDU comprises:

a terminal identifier of the remote terminal, wherein the terminal identifier is a destination identifier of the second relay PDU; and a radio bearer identifier, wherein the radio bearer identifier is an identifier of a radio bearer between the remote terminal and a network device, wherein the at least one instruction is configured to be executed by the processor to cause the remote terminal to implement an operation of:

submitting, by the relay receiver entity, the radio bearer identifier and a PDCP PDU in the second relay PDU to an upper layer, in response to determining that the destination identifier in the protocol header of the second relay PDU is same as an identifier of the remote terminal.

18. The remote terminal according to claim 17, the relay protocol stack further comprises a relay sender entity, and the at least one instruction is configured to be executed by the processor to cause the remote terminal to implement an operation of:

receiving, by the relay sender entity, a PDCP PDU sent from the PDCP layer, generating a first relay PDU based on the PDCP PDU, and transmitting the first relay PDU to a next node;

wherein the first relay PDU is a relay PDU sent from the remote terminal to the network device.

19. The remote terminal according to claim 18, wherein a protocol header of the first relay PDU comprises the terminal identifier of the remote terminal, and the terminal identifier of the remote terminal is a source identifier of the first relay PDU.

20. The remote terminal according to claim 19, the protocol header of the first relay PDU comprises a network device identifier of the network device, and the network device identifier is a destination identifier of the first relay PDU.

* * * * *